United States Patent [19]

Anderson

[11] Patent Number: 4,675,995

[45] **Date of Patent: * Jun. 30, 1987**

[54] COMPACT SEMI-AUTOMATIC CABLE ASSEMBLY SYSTEM

[75] Inventor: James D. Anderson, Norwalk, Conn.

[73] Assignee: Burndy Corporation, Norwalk, Conn.

[ * ] Notice: The portion of the term of this patent subsequent to Aug. 30, 2003 has been disclaimed.

[21] Appl. No.: 702,756

[22] Filed: Feb. 19, 1985

[51] Int. Cl.[4] ........................ H01R 43/04; B23P 19/00

[52] U.S. Cl. ...................................... 29/861; 29/33 M; 29/564.1; 29/749

[58] Field of Search ................. 29/749, 753, 759, 861, 29/33 M, 564.1

[56] References Cited

U.S. PATENT DOCUMENTS 4,367,575 1/1983 Forster et al. ...................... 29/33 M 4,521,960 6/1985 Maack et al. .......................... 29/749

*Primary Examiner*—Howard N. Goldberg

*Assistant Examiner*—Carl J. Arbes

*Attorney, Agent, or Firm*—Perman & Green

[57] ABSTRACT

Apparatus for installing connectors to flat conductor cables comprising an installation station having a platen means for supporting cables in a generally horizontal plane and also having press means for coupling connectors to the cables supported thereat. The apparatus also includes magazines for supporting a plurality of connector portions in a generally vertical orientation and a transport station to sequentially move connector portions from the magazines to the installation station while reorienting them from a vertical orientation to a horizontal orientation. Also disclosed is the method for carrying out the installation with the above described apparatus.

37 Claims, 36 Drawing Figures

FIG. 21A.

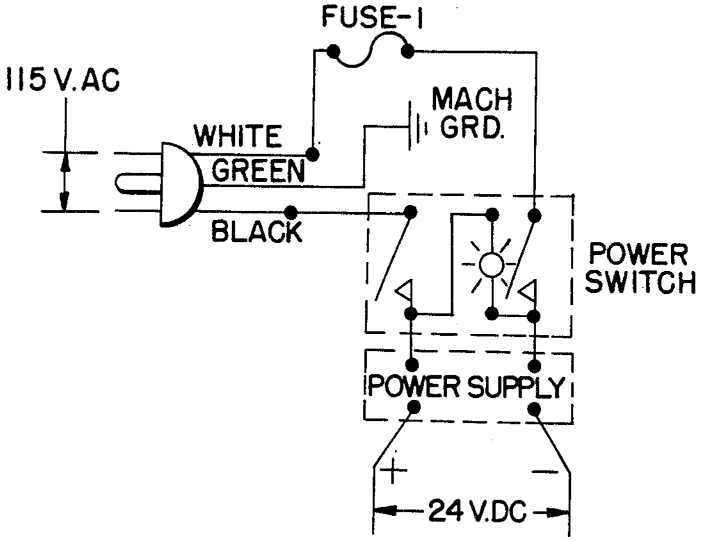

FIG. 21B.

- NORMALLY OPEN (N.O.) SWITCH MUST BE ACTIVATED TO CLOSE
- NORMALLY CLOSED (N.C.) SWITCH MUST BE ACTIVATED TO OPEN

FUSE-1 ○ 1 AMP SLO-BLO STYLE 3-AG

FUSE-2 ○ 1 AMP REG STYLE 3-AG

S1 A & B ○ DOUBLE POLE, DOUBLE THROW TOGGLE SWITCH

S2 ○ THREE POSITION ON SWITCH

MS SWITCHES MECHANICALLY ACTUATED LIMIT SWITCH TYPE

R1-1 R1-2 ETC. ○ SWITCHES OPERATED BY RELAY 1, ETC.

R1 ○ RELAY 1 COIL ETC.

RAM ○ RAM SOLENOID AIR VALVE COIL ETC.

REED 1 & 2 ○ MAGNETIC REED SWITCHES OPERATED BY MAGNET IN AIR CYLINDER PISTON. SWITCH CLOSED WHEN PISTON IS IN RETRACTED POSITION

PRESS-1 -2, -3 ○ SWITCHES OPERATED BY AIR PRESSURE, CLOSE WHEN PRESSURE REACHES PRESET POINT

MS-5 RAM ○ A ONE WAY ACTION LIMIT SWITCH OPENED MOMENTARILY BY UPSTROKE OF RAM

FT. SW. ○ FOOT ACTUATED SWITCH, SINGLE POLE DOUBLE THROW

COMPACT SEMI-AUTOMATIC CABLE ASSEMBLY SYSTEM

BACKGROUND OF THE INVENTION

This invention relates to a compact semi-automatic system for applying connectors to multi-conductor flat cable.

U.S. patent application Ser. Nos. 06/702,976 and 06/702,992 entitled "CONNECTOR TRANSPORT STATION FOR COMPACT SEMI-AUTOMATIC CABLE ASSEMBLEY SYSTEM" and "CONNECTOR INSTALLATION STATION FOR COMPACT SEMI-AUTOMATIC CABLE ASSEMBLY SYSTEM", respectively, are being filed concurrently herewith and have a common assignee with the present application. Since the invention of all three of these patent applications are disclosed as being carried out on the same machinery, the subject matter of the two above-referred applications are incorporated by reference herein.

Multi-conductor flat cable, or ribbon cable, is generally made in strip form and has a plurality of conductors embedded in a suitable integral insulation such as plastic. The strip has substantially flat sides to which connectors are installed, the flat sides of the cable being relatively wide compared to the cable's adjacent edges.

The connectors used with such cables are generally provided in two parts, the body portion and the cover portion, which are placed on the opposite flat sides of the cable and installed thereto. The body and cover portions each have interior or cable-facing sides that are intended to be placed adjacent the flat sides of the ribbon cable for installation thereon.

The cable-facing side of the body portion is provided with electrical contacts such as an array of insulation displacement contacts, IDCs, each of which is intended to mechanically contact and electrically couple with individual ones of the conductors in the ribbon cable through the piercing of the insulation around the conductors as installation takes place. The cable-facing side of the cover portion may have slots, grooves or some other suitable surface configuration for receiving the cable and suitable means, such as legs, clips or other similar elements, which interact or engage with the body so that a secure mechanical attachment is made and maintained between the conductors in the cable and the contacts of the body after installation of the connector onto the cable has been completed.

The prior art contains numerous device, both automatic and semi-automatic, for installing such connectors onto cables. For the most part, these devices load the cable-facing sides of the body and cover portions of the connector in a plane that is generally parallel to the flat sides of the ribbon cable when at the installation station. In addition, the prior art devices maintain this relationship between the cable facing side of the body and cover portions and the cable throughout the handling and movement of these parts until installation onto the connector has been completed.

The prior art design approaches have resulted in rather bulky devices or machines that take up an inordinate amount of space, such as floor space or workbench space, especially in the horizontal plane as the operator faces the machine. This lack of compactness has lead to inefficiencies in utilization of manufacturing space. This is particularly true in semi-automatic versions of such machines wherein several machines are used by several different operators for a variety of jobs in a side by side orientation on adjacent workbenches.

One such prior art device is disclosed in U.S. Pat. No. 4,281,442 to Senior et al. The Senior et al patent discloses a device occupying a large amount of space, especially in the horizontal plane, as can be appreciated by reference to FIG. 1 of the patent. The body and cover portions are supported in magazines which are oriented horizontally, in the same plane as that of the ribbon cable at the installation station. The body and cover portions are loaded into their respective magazine so that their respective cable-facing sides are parallel to the flat cable. In addition, the cover and body portions are maintained in this horizontal orientation until they are installed onto the cable although they are otherwise moved from the magazine to the place where they are installed onto the cable.

Reference is also made to co-pending U.S. patent application Ser. No. 604,788, filed on Apr. 30, 1984, entitled "Apparatus in Process for Manufacturing Electrical Harnesses", filed in the name of Anderson and Cheh, and assigned to the same assignee as the present application. The Anderson et al application discloses a system which is relatively compact yet still fully automatic. It, nevertheless, maintains the cable-facing side of the body and cover portions of the connectors generally parallel to the flat sides of the ribbon cable at the installation station from magazine loading through installation.

Examples of less automated devices for accomplishing the same type of installations are seen in U.S. Pat. No. 4,429,455 Roeker; U.S. Pat. No. 4,486,949 to Allen; and U.S. Pat. No. 4,332,083 to Johnson et al. The Roeker and Allen patents disclose devices which load and feed the cover and body portions through the installion operation while keeping the cable-facing sides thereof parallel to the flat sides of the cable at the installation stations. In additions, the device diclosed in the Roeker patent, as can be appreciated by reference to FIG. 1 of that patent, places his magazines for the body and cover portions in the horizontal plane which requires a large amount of room on the top of the workbench as the operator faces the machine.

The device of the Johnson et al patent takes a different approach to the machine configuration which does result in a somewhat more compact device than many other prior art devices. However, the Johnson et al device relies upon the partial preassembly of the cover portions to the body portions followed by the slipping of the end of the ribbon cable therebetween before installation can take place. In addition, the Johnson et al device would seem to be limited to placing electrically insulating connectors at, or quite near, the ends of the ribbon cable. The Johnson et al device also would appear to be inappropriate for installing electrically conductive connectors mid-span of a cable, particularly at a location on a cable any significant distance from the end of the cable.

A similar pre-assembly approach is disclosed in U.S. Pat. No. 4,344,225 to Johnson, Jr. et al. Here an apparatus is disclosed for pre-assembling a connector housing, which is pre-loaded with a plurality of terminals, with a respective connector cover and subsequently applying the pre-assembled connector to terminate a multi-conductor flat cable. The pre-loaded connector housings and the covers are separately fed to the apparatus by magazines. Each cover is positioned with respect to a housing and applied thereto with the assembly hereafter being rotated and moved to a termination station where a multi-conductor flat cable is terminated by the connector. The device employs a rollover member which initially receives the connector housings.

Hand-actuated tools are known which allow limited movement of one of the jaws to provide engagement of alignment guides to provide even distribution of clamping force on the connector during installation. One such hand tool which is used when applying connectors to ribbon cable is disclosed in U.S. Pat. No. 4,174,560 to Senior et al. Another type of hand tool for crimping connectors onto ribbon cable wherein on jaw can pivot is disclosed in pending U.S. patent application Ser. No. 305,317, filed on Sept. 24, 1981, in the name of Patrick Crossin, and entitled "Compression Hand Tool", and assigned to the same assignee as the present application.

The system disclosed in the present application is an improvement over the prior art in a number of aspects. First, the present system does not require the cable facing sides of the cover and body portions to be loaded into the machine so that they are generally parallel to the plane of the flat sides of the ribbon cable when at the installation station. The cable-facing sides can be virtually oriented in any convenient or necessary orientation when loaded into the magazines and then reoriented to their respective positions substantially parallel to the flat sides of the cable at some point between the magazines and the installation station. This feature is particularly desirable in providing a compact machine for side by side operation with other machines of the same or similar types. The present system is adapted to take up as little workbench space as possible in the horizontal plane, as the operator faces the workbench, while still providing a substantially horizontal orientation for the cable at the installation station. It also provides sufficient capacity in the magazines for the connector parts which extend generally away from the installation station in a direction other than horizontal so as not to interfere with the operation of a closely adjacent machine.

A number of additional features become apparent when reading the detailed description following hereinafter. The present invention is so designed as to be a universal system for not only different sizes of the same type of connector. It is also easily adaptable to accommodate different types of connectors. In addition, an attendent supporting the operator can readily reload the machine with additional body and connector portions even while the machine is operating with such portions being utilized on a first in, first out basis. The alignment of the connector portions in their respective magazines is automatically accomplished during loading so that the connector portion containers or packages can be removed and replaced in the magazines by the operator. The system is designed to counteract any undesirable effects which might result from the opening and closing of the press during the installation process to thereby avoid any relative twisting of the connector parts relative to one another before installation and to provide positive mechanical control over the connector cover portion during the installation process. The system also has dual pivoting platens in the termination station so that the operator can easily and quickly align cables for mid-span or edge connector installation depending upon the configuration of the harness.

BRIEF DESCRIPTION OF THE DRAWINGS

Other objects and advantages of the invention will become apparent upon reading the following detailed description with reference to the following drawings wherein:

FIG. 21A is a further electrical diagram which illustrates operational components for powering the circuit as shown in FIG. 21.

FIG. 21B is a legend to identify the nature of the operational components illustrated in FIGS. 21 and 21A.

SUMMARY OF THE INVENTION

Apparatus for installing connectors to flat conductor cables comprising an installation station having a platen means for supporting cables in a generally horizontal plane and also having press means for coupling connectors to the cables supported thereat. The apparatus also includes magazines for supporting a plurality of connector portions in a generally vertical orientation and a transport station to sequentially move connector portions from the magazines to the installation station while reorienting them from a vertical orientation to a horizontal orientation.

The magazines are located above the transport station and have open upper ends for the receipt of additional connector portions and an open lower end for the gravity feeding of connector portions to the transport station. Each mgazine is adjustable to accommodate connector portions of varying sizes with the upper segment of each magazine being enlarged for the receipt of a package of connector portions and with spring biased surfaces for the support of such connector packages.

The installation station includes a platen with separate spring biased parts with cable supporting surfaces laterally offset from each other and with a space therebetween. The installation station also includes a press having a fixed anvil and a reciprocal ram assembly for coupling connector portions to each other and to a cable on the supporting surfaces.

The transport station includes means to reorient connector parts from a vertical orientation at the magazines to a horizontal orientation at intermediate locations. The transport station also includes pusher means to move the connector portions from the intermediate locations to the installation station.

Control means are also provided for effecting the predetermined sequential movements of the above referred to apparatus at the initiation of an operator.

A method is also provided for carrying out the installation of connector portions to cables with the above described apparatus in a continuing cycle of operation. The method also includes the step of properly orienting the cable on the platen through the use of abutment surfaces.

DETAILED DESCRIPTION

Figure 1:
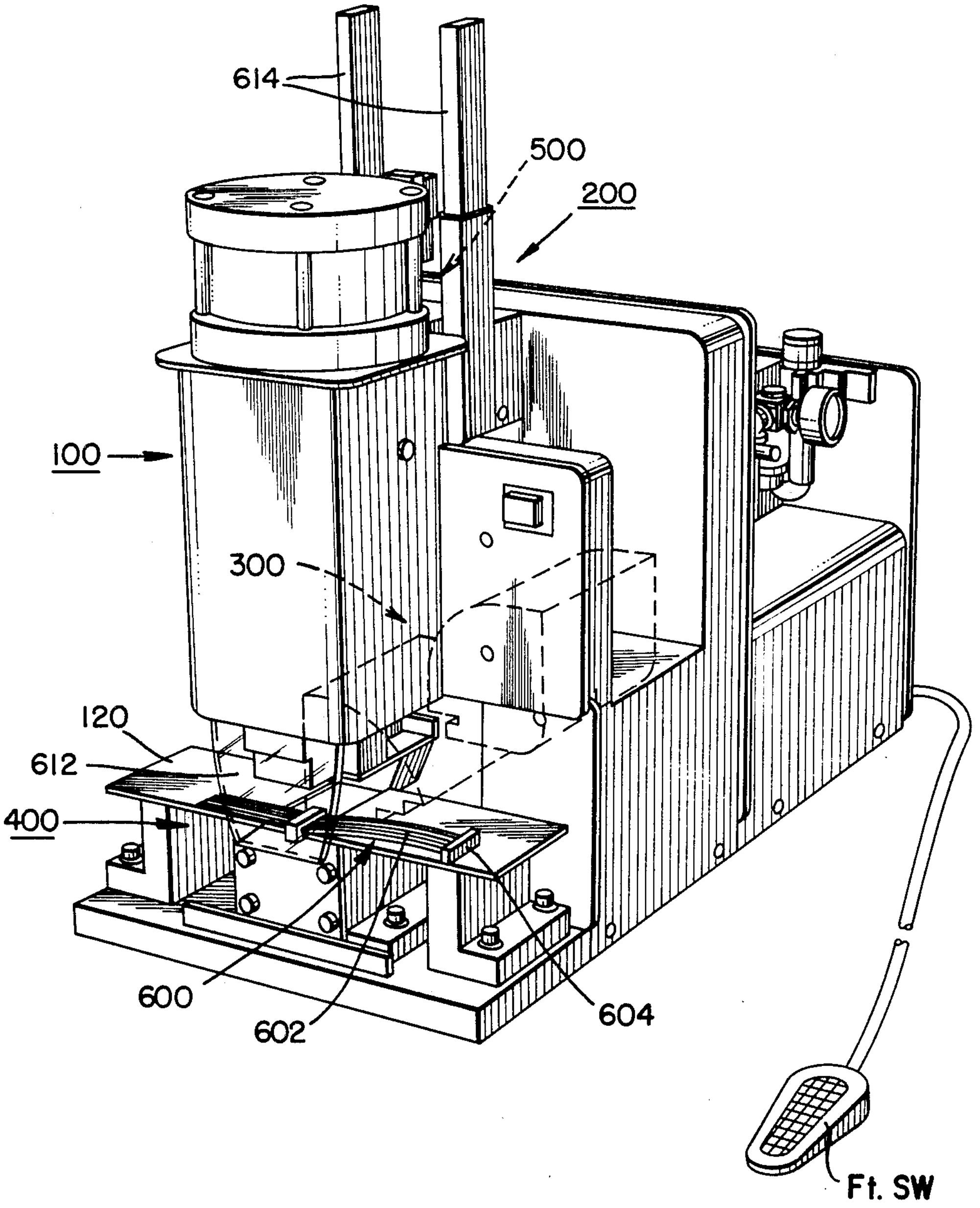
FIG. 1 is a perspective view of the preferred embodiment of the invention showing the semi-automatic cable assembly system embodying the principles of the present invention.

The system described herein is a semi-automatic cable assembly system for manufacturing harnesses from a variety of suitable cables, such as flat ribbon cable, and suitable connectors, such as insulation displacement contacts (IDC) socket connectors. The general configuration of the system is shown in FIG. 1.

Connectors can be installed on one or both ends of the cable or anywhere midspan between the ends of the cable to generate any variety of harness configurations. The term "cable" as used herein is intended to be a generic term which applies to any suitable conductor of electricity. For instance, it is intended to apply to ribbon cable which has a plurality of parallel conductors covered by an insulating material which keeps the conductors together as an integral unit while insulating them one from another.

Various types of ribbon cable can be used such as those sold by Belden Corporation, Framingham, MA 01701 wherein both sides of the cable are fully ribbed. Other types of cables can also be used wherein one side is fully ribbed and the other side has a basically flat surface with small grooves, and, a type wherein one side is fully ribbed and the other side is flat with shallow ribs.

Figure 2A:
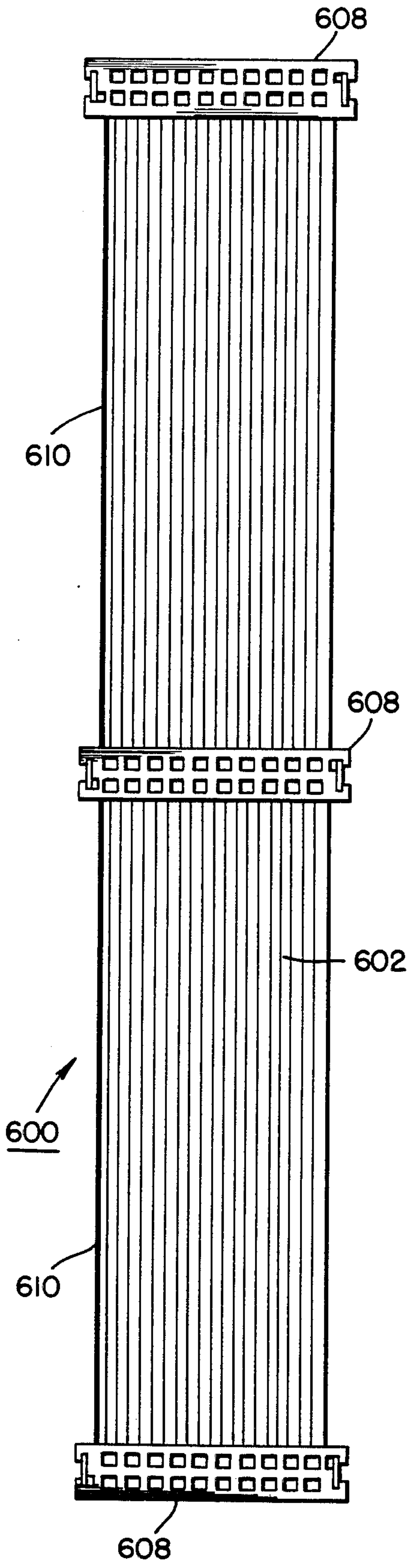
FIGS. 2A-C are top, side and bottom views, respectively, of a representative harness made by the system shown in FIG. 1.

The ribbon cable used herewith can have any suitable number of conductors. For instance, the representative harness shown in FIGS. 2A–C can be made with a cable with any suitable number of conductors, such as 20, any two adjacent conductors being approximately 0.050 inches apart. The cable can have a mark to indicate the number 1 conductor in order that the operator of the system described herein can correctly orientate the cable relative to the connectors during the harness manufacturing process.

The term "connector" as used herein is intended to be generic also. For instance, it is used herein to apply to connectors which are supplied in a plurality of parts, such as a cover portion, sometimes called the cover part or the cover, and a body portion, sometimes called the body part or body, which are joined together upon installation onto the ribbon cable. Suitable types of connectors for use with the system described herein are, for instance, FRS socket connectors, FRE edgecard connectors, FRD dip connectors, etc., all sold by Burndy Corporation and described in Catalog No. 1013, "Insulation Displacement Connector Systems" of Burndy Corporation. The basic system described herein can accommodate a variety of types of connectors and, in addition, can accommodate all of the various sizes of connectors within any given type.

All of the above types of connectors may contain electrically conductive insulation displacement contacts, or IDCs, wherein the electrically insulating body portion of each connector has mounted thereon a plurality of closely placed electrically conductive IDCs. Each connector also includes an electrically insulating cover portion having slots for receiving the ends of the IDCs and for holding the IDCs separate, one from another. The cover portion usually includes edge clips disposed thereon which are designed to project into cooperative grooves of the body portion upon installation. The clips, in cooperation with the clip grooves, align and hold the body and cover portions together and onto the ribbon cable. As the body and cover portions are squeezed together onto the ribbon cable, the IDCs penetrate the insulation of the ribbon cable and push it aside so that each IDC makes physical contact and an electrical coupling with a conductor within the ribbon cable.

When the connector is fully applied to or installed onto the cable, the IDCs will have cut through the insulation, made contact with the individual conductors to provide electrical contact and the cover portion will be engaged with the body to maintain such contact. The cover portion will also be engaged with the body through the clips to maintain such contact. The insulation around the conductors prevents the conductors from having contact with each other or any external elements. Thus each wire, upon being coupled with its IDC, is capable of carrying a separate and independent electrical current or signal.

Harness 600, shown in FIGS. 1, 2A–C has three connectors 604 thereon, each connector having a cover portion or part 606 and a body portion or part 608. The configuration of the harness shown in these Figures is such that all of the connectors are installed in the down position relative to the cable. The cable also has a first conductor marking 610 thereon so that the operator can orient the cable correctly during the manufacture of the harness.

Figure 2B:
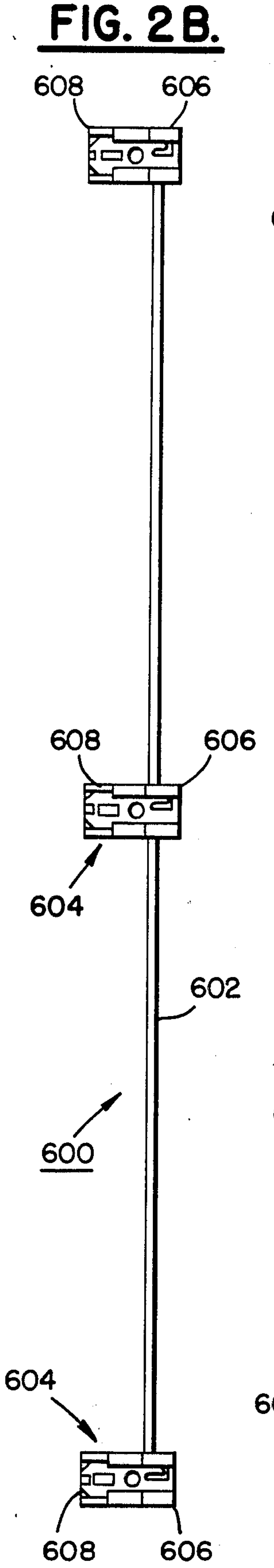

The present apparatus and method for assemblying harnesses is semi-automatic in that there is some operator involvment in such manufacture. The system automatically feeds and presents connector parts from a magazines to the installation press in proper orientation and then automatically installs the connector onto the cable. However, the operator must properly align the cable in the termination station so that each connector is placed on the proper portion of the cable in either the "down" orientation, as shown in FIG. 2B or in the "up" orientation which is the opposite thereof. Such alignment is provided by various features of the platen in the installation station which will be disclosed more fully hereinafter.

FIG. 1 gives a general overview of the preferred embodiment of the system used to make harnesses. The system includes a press assembly 100, two magazine assemblies 200, two transfer assemblies 300 shown in phantom in FIG. 1, a installation station 400, and electro-mechanical controls 500 located within the system but not seen in FIG. 1. FIG. 1 also shows the general location of connector part container or packages 614.

As can be clearly appreciated from FIG. 1, the semi-automatic cable assembly system presents an extremely compact system for the manufacture of electrical harnesses. Such compactness is to a large extent derived from the unique combination and orientation of elements in the system and the manner in which the connector parts are transported from the connector packages to the termination station. One aspect of such compactness is the use of vertical feed connector packages 614 and with vertical feed magazines thereunder the transfer assemblies which receive the connector parts in the orientation provided by the vertically oriented connector part packages. The transfer assemblies reorient the connectors parts, such as approximately 90 degrees through a rotary motion, before they are placed into the press for installation to the cable.

In this embodiment the press has a ram which operates in approximately the vertical plane while the cable 602 is oriented by the operator in an approximately horizontal plane while being worked on in the installation station. Thus, the connector loading system and press operate in substantially the same plane in this embodiment the substantially vertical plane while the cable is placed in a substantially perpendicular plane relative thereto for installation.

This arrangement enables the machine to be designed so that it requires very little workbench area, utilizes the height above the table, which is generally open in a factory for the press and loading of connector parts into the magazines, and provides a very accessible, visible and substantially flat, open work area at the installation station for the operator to align the cable for connections. Further, it can be seen that several operators can be placed side by side working on a plurality of such semi-automatic cable assembly systems. This minimizes the work area on the benchtop for each machine yet utilizes the height in the space above the machine for the bulk of the machine which is generally not as important as the benchtop work area in a production environment.

The system is also designed so that it can be easily applied to handle various types of connectors. This enables minimum changes to the parts of the system to convert it from FRS socket-type connectors to FRE edgecard type connectors, to FRD DIP (dual in-line package) type connectors, etc., such as those made by Burndy Corporation of Norwalk, CT, Also, when the system is set up to handle a particular type of connector, for instance, the FRS socket type connector, very minimal changes are required to handle any of the sizes of that type of connector. For instance, at present, there are 10 sizes of FRS socket connectors made by Burndy Corporation, the sizes covering 10 to 64 pin positions. Although there are a large number of different sizes, the operator can change the magazine very readily to switch from one size to another and, thus, the machine has a good deal of flexibility in the production environment.

One embodiment of the semi-automatic cable assembly system will now be described in detail in the context of assemblying FRS socket connectors onto ribbon cable. However, it should be understood that the general configuration, the specific combination of elements, and the details of this process and apparatus are not limiting on the adaptation of the system to other types of connectors such as FRE edgecard, FRD DIP, etc. connectors.

Figure 3:
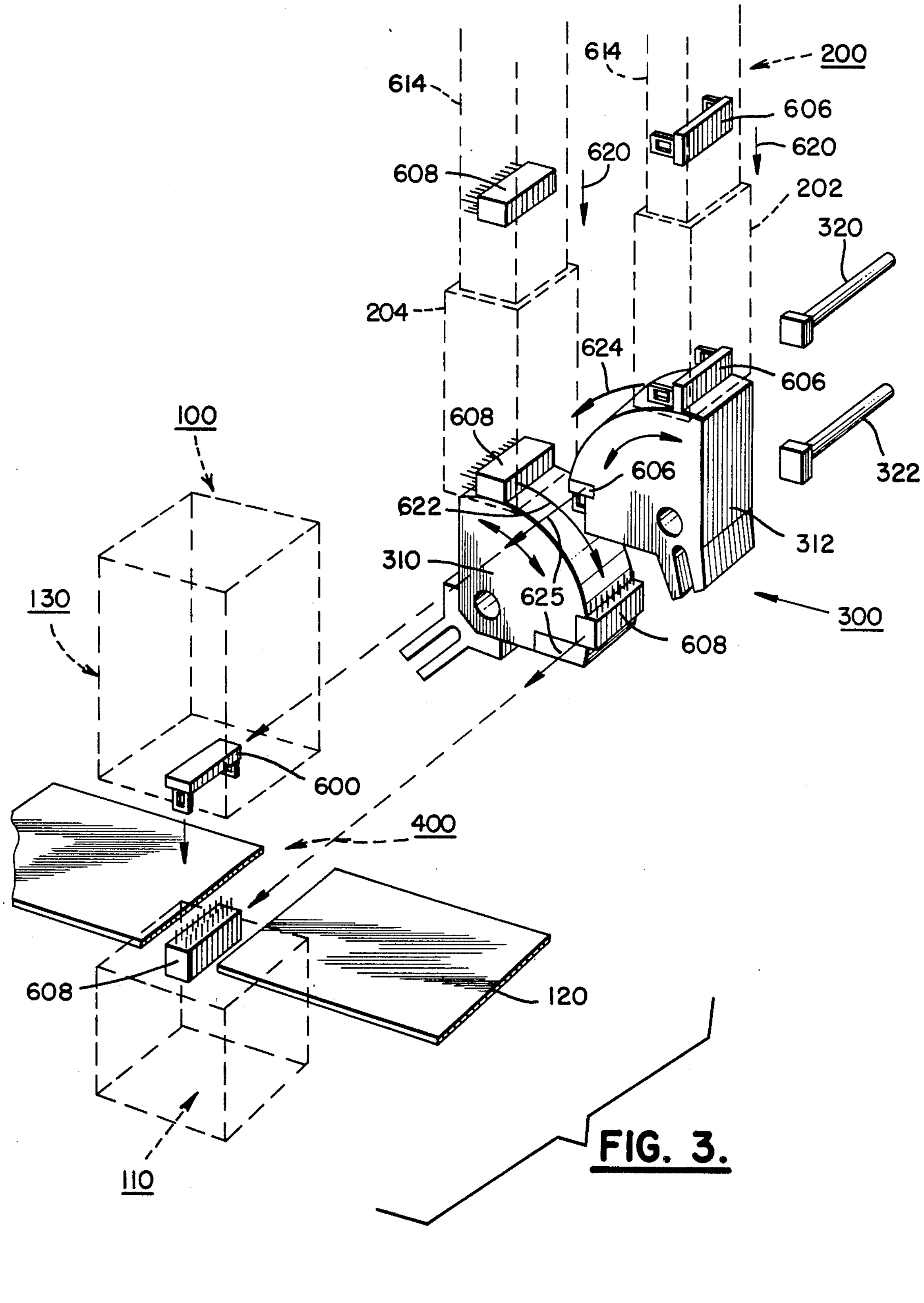
FIG. 3 is an illustration, looking generally from the front of the system where the operator sits or stands and showing the respective paths of the connector body and cover portions between their respective magazines and the press where the portions are installed onto the cable.

To better appreciate the path of transport of the body and cover portions that are eventually installed onto the ribbon cable, reference is had to the schematic illustration in FIG. 3 showing the paths between their respective connector portion packages and the installation station where the body and cover parts are ultimately assembled onto the cable.

The body portion 608 and cover portions 606 are supplied to the system in removable connector portion containers or packages 614 which slide into magazines 204 and 202 to supply connector portions to the magazine by gravity in the direction shown by arrows 620 of FIGS. 3. From the magazines, the connector portions are fed into the area of transfer assembly 300. Body portion reorientation means or transfer member 310 then rotates connector body 608 in the clockwise direction approximately 90 degrees and cover portion reorientation means transfer member 312 rotates the connector cover 606 in the counterclockwise direction approximately 90 degrees. By such rotation, the connector body portion 608 and cover portion 606 are reoriented so that they will be in proper alignment when they are brought to the press 400 for termination onto the ribbon cable. In other words, the cable-facing side of each connector portion is placed substantially parallel to the flat sides of the cable in the installation system by such rotation. In FIG. 3, the rotation of the body 608 is indicated by arrow 622 while the rotation of the cover is indicated by arrow 624.

Once the body and cover portions are rotated by their respective reorientation means or transfer members, cover portion pusher means 320 and body portion pusher means 322 move from behind the transfer assembly towards the press 400 to push or unload the body portion 608 and cover portion 606, respectively, into the termination station. The direction in which the body and cover portions are pushed to the press area in the installation station is indicated by arrows 625 of FIG. 3.

The body portion 608 is placed in anvil 110 of press 400 by the linear movement of pusher 322. The cover 606 is placed in the ram portion 130 of press 400 by the linear movement of pusher 320. The pushers then retract to their home positions and, ram means 130 drives connector cover portion 606 down onto connector body portion 608 with the cable therebetween, not shown in this FIG. 3 view, to install the connector onto the cable. The ram means 130 then returns to its home position. The transfer members or reorientation means and the pusher means, when considered together, constitute a transport station for the connector portions.

Thus, as can be seen from the above-described transport of connector portions 606 and 608 from the connector part packages to the installation station, an extremely compact semi-automatic cable assembly system is disclosed herein. The system uses the combination of vertical feed magazines to which the connector part packages are attached, a horizontal ribbon installation station or area and a reorientation, approximately 90 degree rotation in this embodiment, of the connector portions between the magazines and the installation area to orient the connector parts properly for installation. Even though the work area is horizontal in this embodiment, the feed of the connector parts from their packages and through the magazines are in the vertical or normal direction relative to the installation station. This combination provides a very compact unit which does not take up much width on a workbench or table on which it is placed. The device efficiently uses the height above the workbench primarily for the loading of relatively long connector packages into the system.

Figure 4:
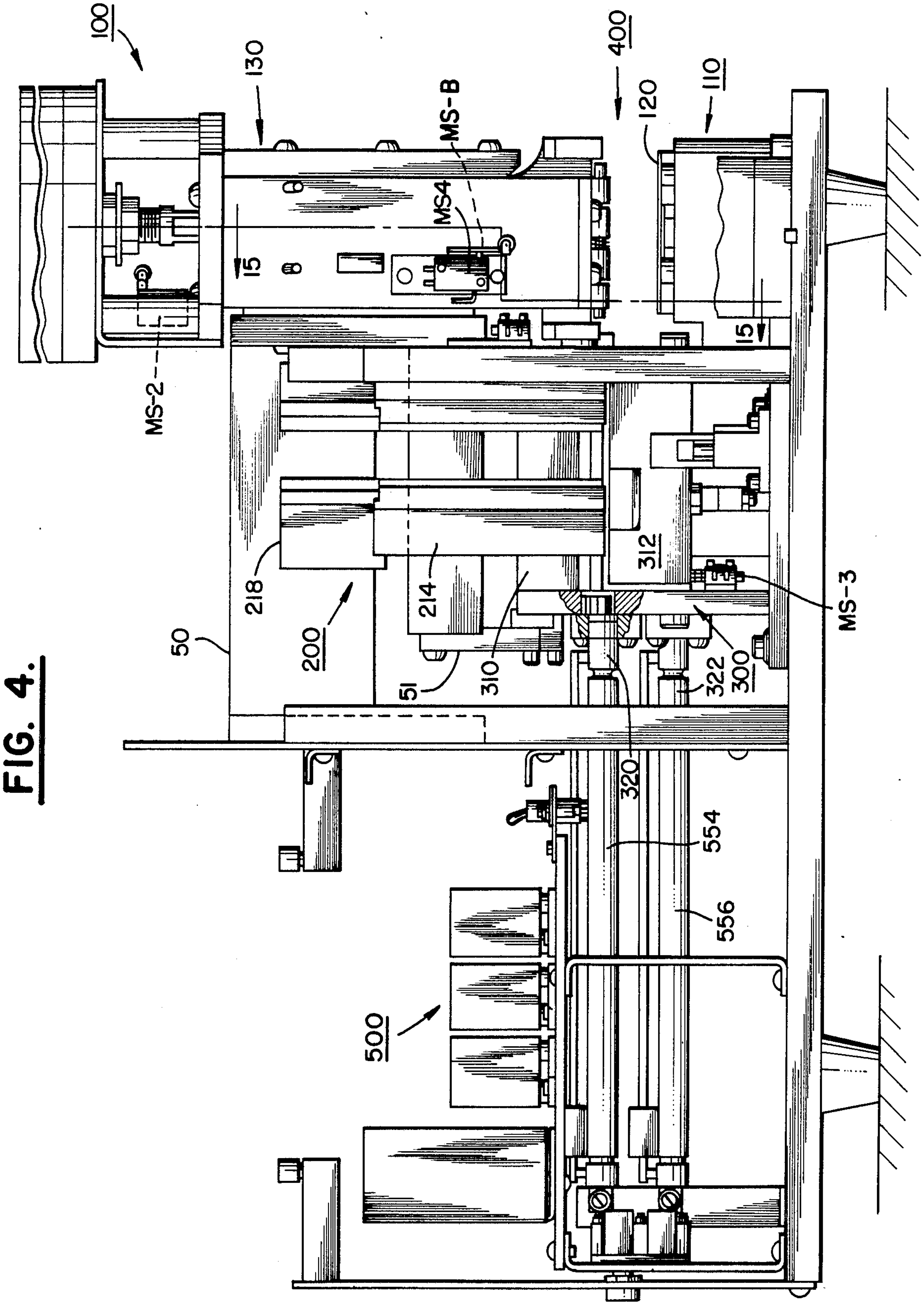
FIG. 4 is a side view of the system shown in FIG. 1.
Figure 5:
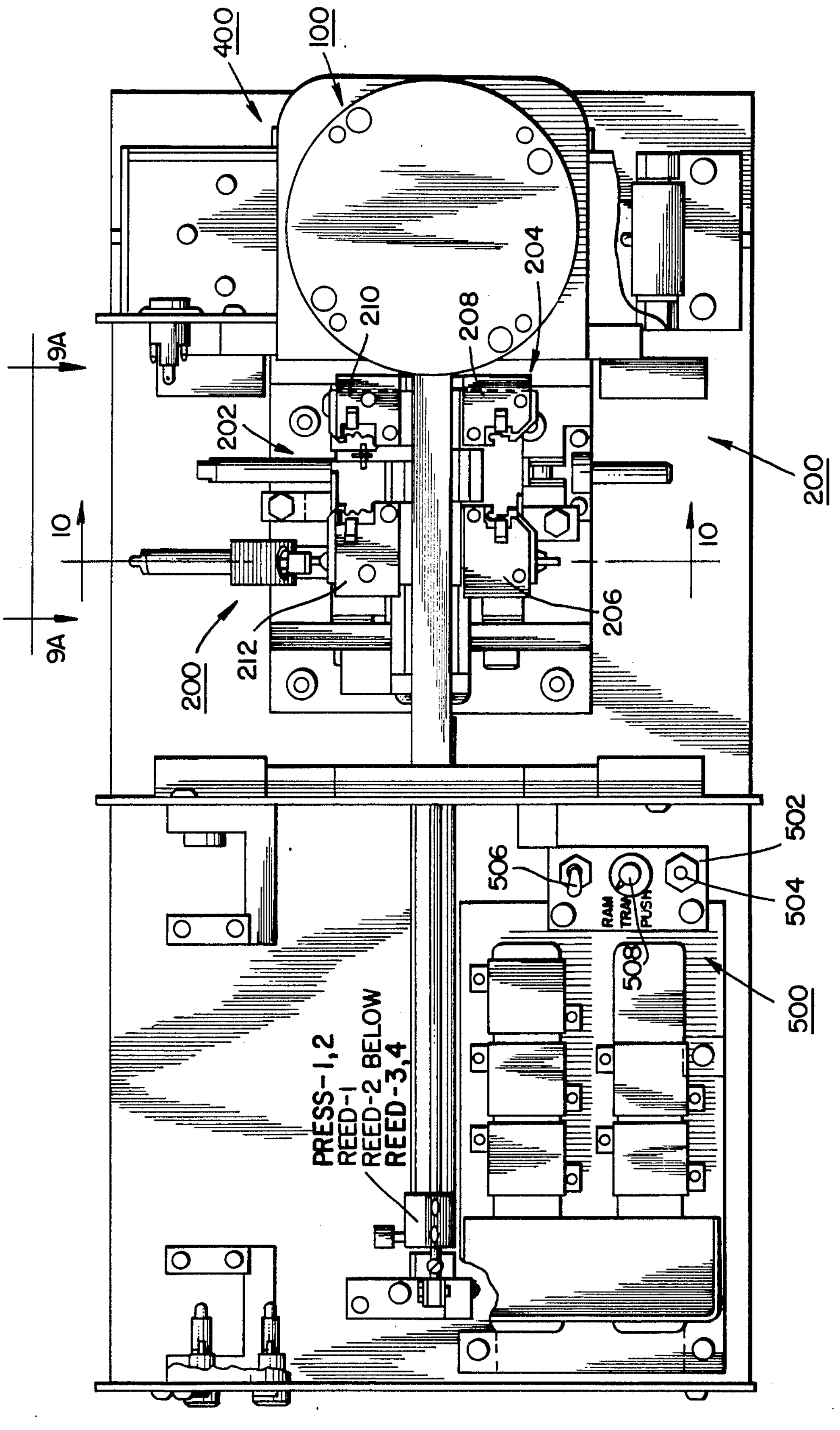
FIG. 5 is a top view of the system shown in FIG. 1.
Figure 6:
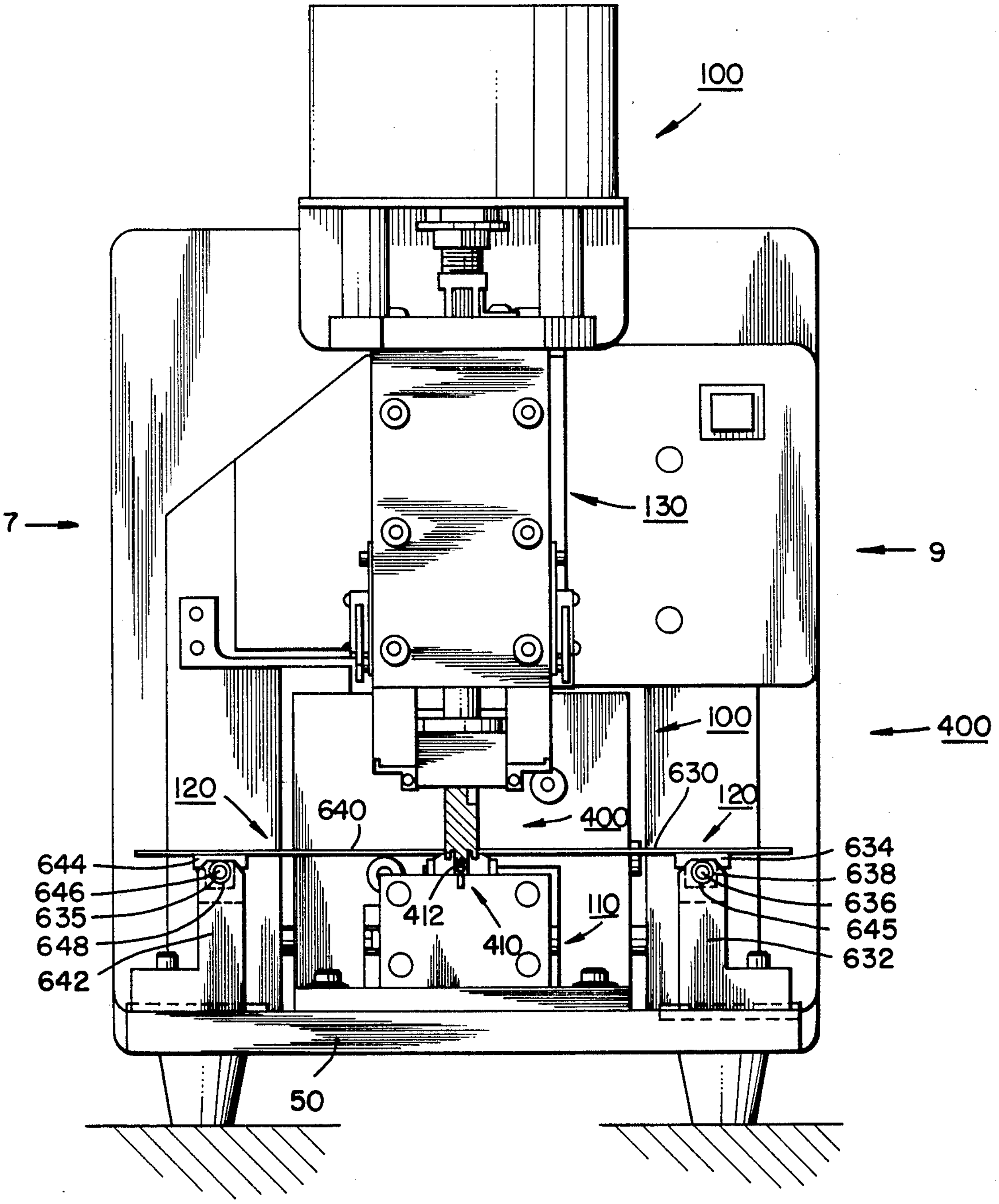
FIG. 6 is a front view of the system shown in FIG. 1.

FIGS. 4, 5, and 6 are side, top and front views, respectively, of the system. The description of the various assemblies of the system and the manner in which it is operated to make harnesses will now be described in conjunction with these and other subsequent figures.

The general location of magazine assemblies 200 in the system can be seen in the illustrations of FIGS. 4, the most detailed showing of such magazines being in the FIG. 5 top view. FIG. 5 shows the magazine assembly as having two similar magazine assemblies 202 and 204 which enable the feeding of the cover portions 606 and body portions 608, respectively, from connector packages 614, not shown in this view, into the transfer assembly 300 which is more clearly shown in FIG. 4.

Figure 7:
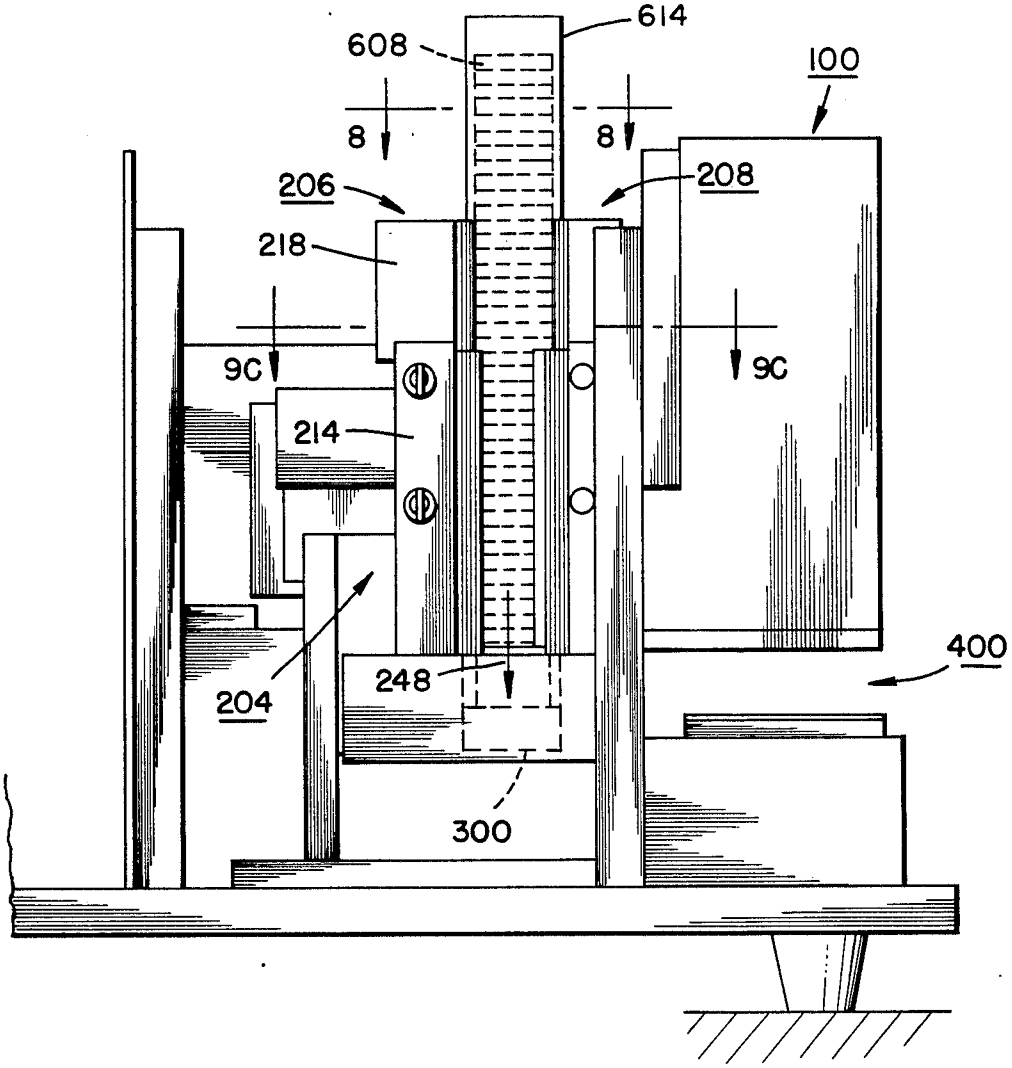
FIG. 7 is a partial illustration of the system shown in FIG. 1, viewed from the left side, depicting the connector portions located in the magazines of the system.

FIG. 7 is a partial illustration of the apparatus shown in FIG. 4 but showing connector portion package 614 with connector portions contained therein. The body portions only are shown in this view because it is viewing the apparatus from the left hand side. The cover portion package 614 is behind the body portion package in this view and thus not visible. The connector packages 614 are seated into magazine 200 so that the connector portions contained therewithin are fed into the magazine and then on for further processing in the apparatus.

Figure 8:
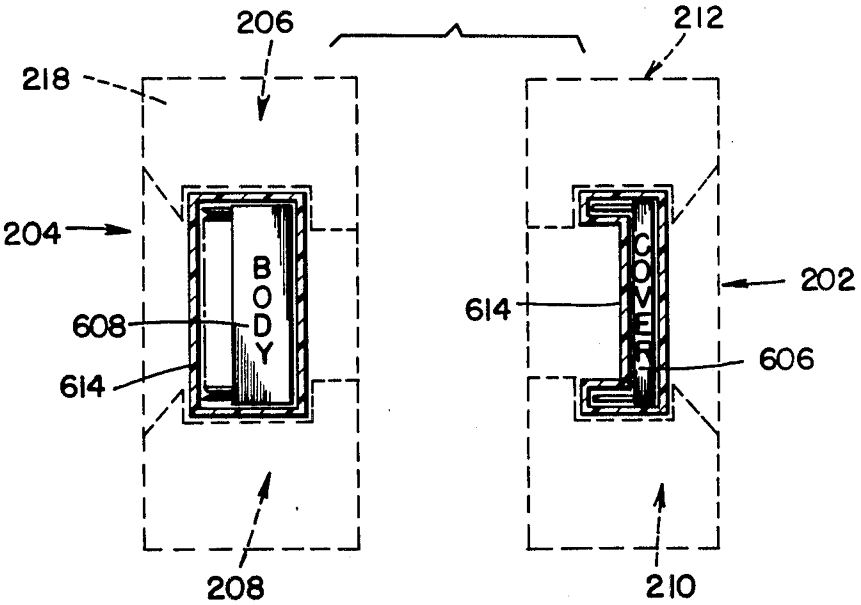
FIG. 8 is a partial cross sectional view of the magazines and connector portions visible in FIG. 7, taken through section 8—8 of FIG. 7 and showing the details of the connector portions and magazines.

FIG. 8 is a partial schematic cross-sectional view of the system shown in FIGS. 7, taken through section 8—8, which shows the details of the connector portions packages, one each for the body and the cover portions of the connector. In FIG. 8, the left hand magazine is adapted to receive connector portion package 614 which in turn contains the body portion 608 of the connector. To install it in the magazine assembly 204, the operator merely locates the end of the package onto the top portion, or cap, of the magazine and pushes down slightly to engage it with the magazine. The right hand portion of FIG. 8 also contains a connector part package 614 which is operatively engaged with magazine assembly 202 and contains cover portions 606 of the connector. As can be appreciated from FIG. 7, the magazine containers 614 can be any suitable length so as to contain a plurality of connector part portions, either cover or body portions as is suitable to be fed into the machine. Thus, for longer production runs, connector packages 614 can be of greater length to contain more connector portions for convenience.

The general shape of the respective connector packages 614 will, to an extent, conform to the shape of the connector part located therein. For instance, looking at the connector package 614 that contains bodies 608 on the left side of FIG. 8, the internal configuration of the container is basically a rectangle to conform to the shape of the body 608. The body portions are aligned all in the same direction and appropriate clearance is made between the inside surface of the connector package 614 and the body portion surfaces so as to keep them in alignment yet allow the bodies to drop down toward the magazine through gravity feed without becoming jammed in the connector package 614.

The connector cover portion 606, in this embodiment, is basically a U-shape. Its container 614, as shown on the right side of FIG. 8, is appropriately shaped in cross-section to accommodate the U-shape. Likewise, there is appropriate clearance between the edges of connector cover portion 606 and the inside surfaces of connector package 614 so that the cover portions 606 are kept in proper alignment and easily feed through gravity as covers are removed from the bottom of the connector package 614 and dropped into the magazine as the machine operates.

Although not shown, the upper ends of connector packages 614 have suitable means for closing them off when the connector packages are out of the system. This is to keep the connector portions in the packages while in shipment, storage or when being handled by the operator to load or unload them from the system. Such means could include a small piece of pliable material for end stops which are stuffed into the open ends of the connector packages. The material on the end of the container to be inserted into a magazine would have to be removed by the operator before such insertion.

As can be seen from FIG. 7, the connector packages 614 are merely slipped into the top or cap of the magazine to operatively engage the cover or body portions into the system. After the operator removes the endstop from one end of the connector package 614, he inserts that end down into the magazine subassembly 204 until it rests therein firmly. No other installation steps are required. Thereafter, as the system calls for and uses connector portions, they will be fed from the connector packages 614 down through magazine subassemblies and onto the transfer assemblies as the system requires them. Upon the finishing of a run or upon the emptying of a particular connector cartridge, the operator will remove the package 614 by pulling it up out of magazine subassembly and replace the endstop on the end that was previously facing down. The operator may have to place his finger over the end of the package 614 facing down as he pulls the entire package up out of magazine subassembly to keep any remaining connector portions contained therein in the package until the endstop has been inserted.

Figure 9A:
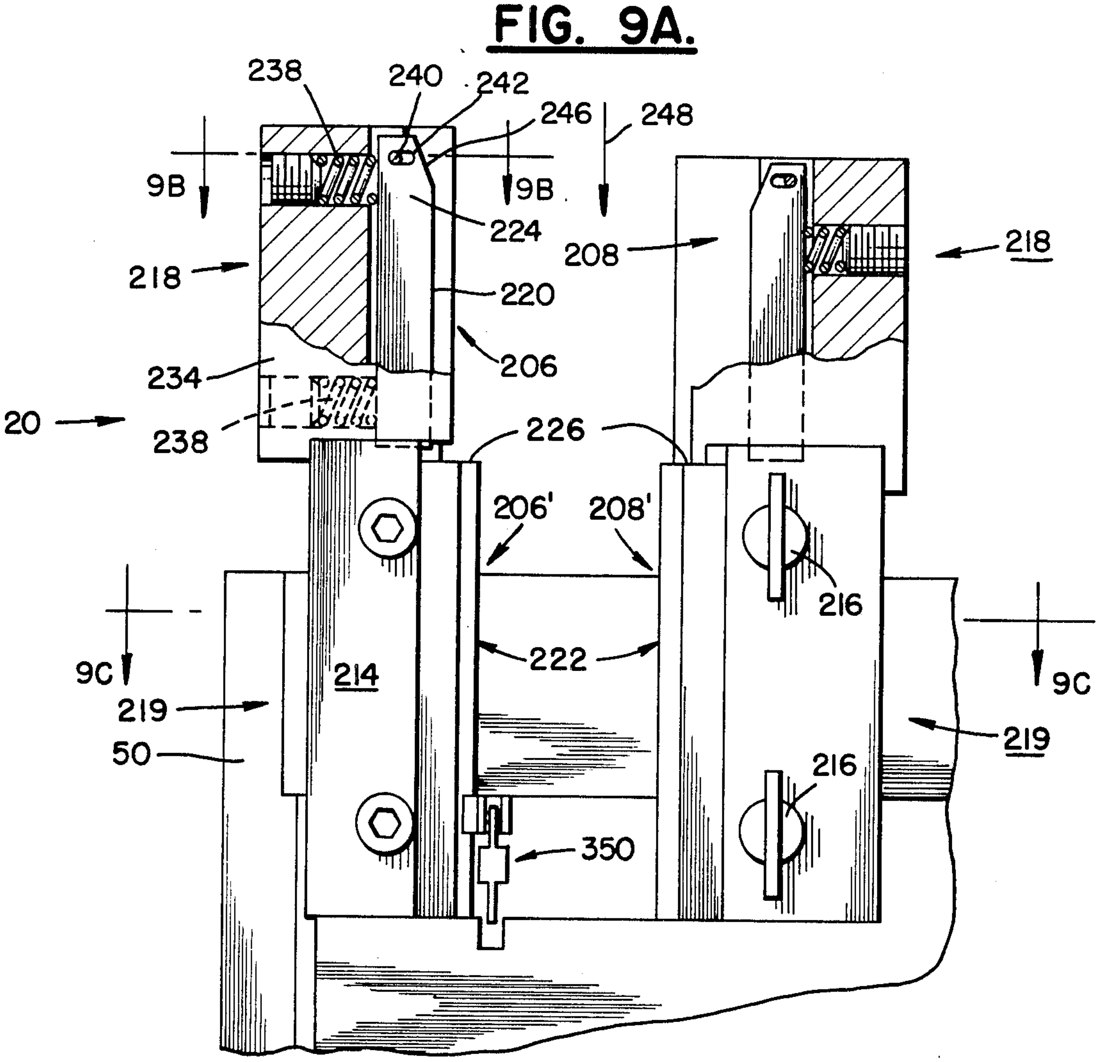
FIG. 9A is a partial fragmented view of the cap portion of the magazine, on the right side of the system.
Figure 9B:
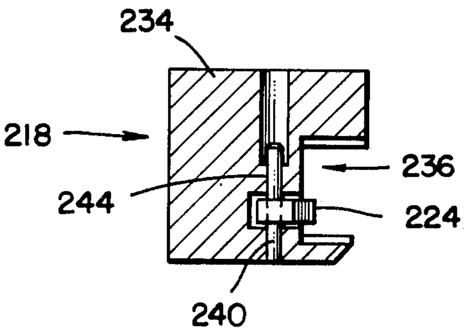
FIG. 9B is a cross sectional view of the cap shown in FIG. 9A taken across section 9B—9B of FIG. 9A.

The construction of the magazine assemblies will now be described in detail with reference to FIGS. 9A–C in conjunction with FIGS. 5–8. FIG. 9A is a partial fragmented view of the cover portion magazines assembly 202 which is located on the right side of the system as viewed in FIG. 3.

The magazine 202 has a cap portion 218 and a base portion 219. The cap portion has two guide sections, left guide 206 and right guide 208 which receive connector packages 614. The connector portions which are gravity fed from the packages 614 enter the base portion of the magazine and are fed thereby to the the transfer assemblies 300. Body portion magazine assembly 204 is of similar construction and essentially performs the same function as assembly 202.

Referring again to FIG. 9A. left side cap guide 206 is attached to left side base guide 206′ which in turn is attached to machine frame 50. Right cap guide 208 is attached to right base guide 208′ which in turn is movably attached to frame 50 of the system. Right base guide 208′ can be fastened to frame 50 in any suitable manner such as by suitable releasable fasteners 216. Fasteners 216 can be made to be easily loosened by the operator so that right side base guide 208′ can be moved relative to left side base guide 206′, which is stationary, to adjust for various sizes of container packages which in turn will vary according to the size of connector portions to be used. The magazine for the body portions is similar to the cover portion magazine with the exception that since the movable base guide is always that guide closest to the rear of the machine, the base guide on the left as one looks at the body magazine from the side of the system, contains the fasteners and is movable relative to the frame 50. This is to enable the edges of the bodies and covers, regardless of their sizes, to be registered to the fixed guide of both magazines which is always the closest to the front of the system or installation station.

Thus, the magazine assemblies are adaptable to all the various sizes of connector portions within a given type of connector. Since one guide of each magazine assembly is fixed in the system and the movable guide can be adjusted by the operator relative to it, the magazines can be readily adjusted to the particular size of each connector package and thus the connector portions.

Referring again to FIG. 9A, frame member 50 can have two slots, not shown, in which appropriate releasable fastening devices 216 can move while the movable guide is being shifted either to the right or left. For instance, the fastening devices may be a wing nut as shown in FIG. 9A attached to a bolt which has a head on the other side of the slot in frame member 50. When the wingnut is screwed tightly onto the movable base guide, the guide is fixedly attached to the frame member 50 in that location for operation. On the other hand, when the wing nut is loosened, the guide can slide right or left because, the bolt associated with the wind-knot is able to slide within the slots of frame member 50.

Cap portions 218 are firmly attached to their respective base portions 219. Each cap portion 218 has a spring biased shoe 224 mounted thereon, the shoe having a movable surface for slideway 220 thereon while magazine base member 214 has a surface or slideway 222 mounted thereon. Surface or slideway 220 is not aligned with surface or slideway 222 in the vertical direction, the difference being the sidewall thickness of the connector package.

As a connector package is loaded into the magazine, such as a cover portion package placed in the magazine shown in FIG. 9A, the package edges will contact movable slideways 220 on shoes 224. As the operator brings the package down into the cap, the lowermost end of connector package 214 will seat on surface or stops 226. In this position, as the cover portions drop from the connector package by virtue of the force of gravity, surfaces or slideways 222 provide a surface or track along which the side of the cover will slidingly progress downwardly. This structure ensures that the cover portions are maintained in alignment to be properly fed to the transfer assembly. Due to this surface, the cover portions cannot significantly tilt relative to the vertical surfaces 222 and they will be kept in alignment as they slide down into transfer assembly 300. A similar arrangement for alignment are made in the body portions magazine assembly on the other side of the machine.

Figure 9C:
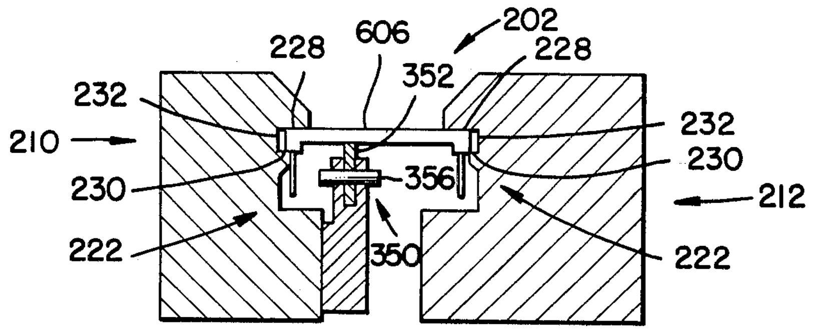
FIG. 9C is a cross sectional view of the magazine shown in FIG. 9A with a connector cover portion therein taken through cross section 9C—9C of FIG. 9A.

FIG. 9C is a schematic view of the cover magazine with a cover portion therein, the view taken from section 9C—9C of FIG. 7. The edge of cover portion 606 is held in place and guided by the exterior or back surface 228, end surface 232, and front or cable-facing surface 230. Lead in chamfers or radii can be placed on the upper edges of the magazine base member in order to ease the entrance of cover portion members as they fall from connector package 614 into the base along way 222.

The basic purposes for cap 218 is to receive, hold and align connector packages 614 to the proper orientation relative to the magazine base so that proper feeding of the cover or body portions to their respective magazine bases can be accomplished. The unique design of cap assembly 218 enables the operator to readily reload the machine while it is running. Cover and body portion feeding towards the transfer assembly is a result of simple gravity feed from the removable, interchangeable connector packages into the machine magazine area. The cap design is described in conjunction with cover portion magazine assembly 202, but the body portion magazine assembly 204 is of the same construction.

A fragmentary side view of cap 218 is shown in FIG. 9A. A top sectional view of the cap, taken through section 9B—9B of FIG. 9A, is shown in FIG. 9B. The cap 218 includes cap block 234 which is fixably attached to the magazine base 50. Cap block 234 has a connector package groove 236 which generally runs in the vertical direction in this embodiment. The purpose of groove 236 is to provide clearance for, as well as hold, connector packages 614. Cap block 234 also has shoe 224 running generally within groove 236 which is movable to the right or left relative to block 234, as viewed in FIG. 9A. The purpose of the shoe is to center the connector packages, to hold the connector packages in a generally longitudinally parallel direction with slideway 222 and the magazine base and to help hold the connector package in place within the cap portion.

Shoe 224 is biased to the right as shown in FIG. 9A. The shoe is supported in this biased condition by springs 238 which exert a force between the cap block 234 and shoe 224 to bias the shoe into a position towards the connector package 614. The shoe 224 is kept on cap block 234 by two retainer pins 240. The retainer pins 240 are located in the top and bottom areas of shoe 224, only the top one being visible in FIGS. 9A and 9B. The retainer pins 240 are retained in cap block 234, such as by being press fit into hole 244 in the cap block, and pass through slot 242 in the shoe 224. Thus, shoe 224 can move to the left or right as viewed in FIGS. 9A and 9B to the extent provided by slots 242, the cap block 234 and spring bias 238.

When the operator places the end of a connector portion container 614 into magazine assembly, chamfer 246 will first be hit by the side of the package as the package is inserted or pushed into the cap 218. Shoe 224 will be driven to the left enabling the package to be lowered into the magazine. Since the magazine has been seated on stop 226 of magazine member 214, or is bottomed thereon, spring 238 biases the shoe 224 so that shoe 224 tightly holds the sidewalls of connector portions package 214. Because there is some length to the vertical direction of shoe 224 and because shoe 224 is spring biased in both its top and bottom, shoes 224 on each side of cap 218 will tend to center the connector package at the center line of surfaces 222 and the magazine base and hold the package in this position while body portions are gravity fed down towards the magazine members. When the connector package is levelled and centered, the connector portions that exit the bottom of the connector package to the magazine are also levelled and centered.

As connector parts are fed through the semi-automatic cable assembly system and replacement parts are required from connector packages 618, those replacement parts bodies fall by gravity out of the connector packages into the magazines and pass down through the magazines to the transfer assembly 300 as shown in FIG. 7. Since the connector portions are used one at a time in pairs, there will be one-at-a-time feeding of the parts to transfer assembly 300. Thus, there will be columns of cover portions and body portions stacked one on top of the other from the transfer assembly up through the cover and body portion magazines and on up into the cover and body connector packages 614 shown in FIG. 7 until all of the connector parts are used up.

Upon being fed to the transfer assembly, a body and cover portion pair is reoriented by the transfer assembly so that their cable-facing surfaces are brought into substantially parallel relationship to the flat sides of the ribbon cable while in the installation station. As shown schematically in FIG. 3, the lowermost connector portions held by the magazines are located on transfer assembly 300. The transfer assembly includes two transfer members, body transfer member 310 and cover transfer member 312. The connector cover portions 606 are brought down to the bottom of the magazine 202 where the lowermost one is engaged by transfer member 312 and rotated in the counterclockwise direction approximately 90 degrees. Similarly, lowermost body portion 608 in magazine 204 is captured by transfer member 310 which rotates the body connector portion 608 in the clockwise direction approximately 90 degrees.

The respective reorientations of the cover and body portion are an important feature regarding the system. By combination of the vertical feed magazines, horizontal ribbon installation area to be described below, and reorientation means, in this case by a substantially 90 degree rotation of the connector portions through the transfer assembly, a very compact system is provided. The effect of the transfer assembly is to take the connector portions which are oriented in the most efficient position to utilize the space available. In this embodiment, the connector packages are extending directly above the machine and do not occupy excessive workbench area. The transfer members reorient the connector portions into a position and an alignment so that they are properly oriented for application onto a cable which is lying generally in a horizontal position relative to the operator.

Figure 10:
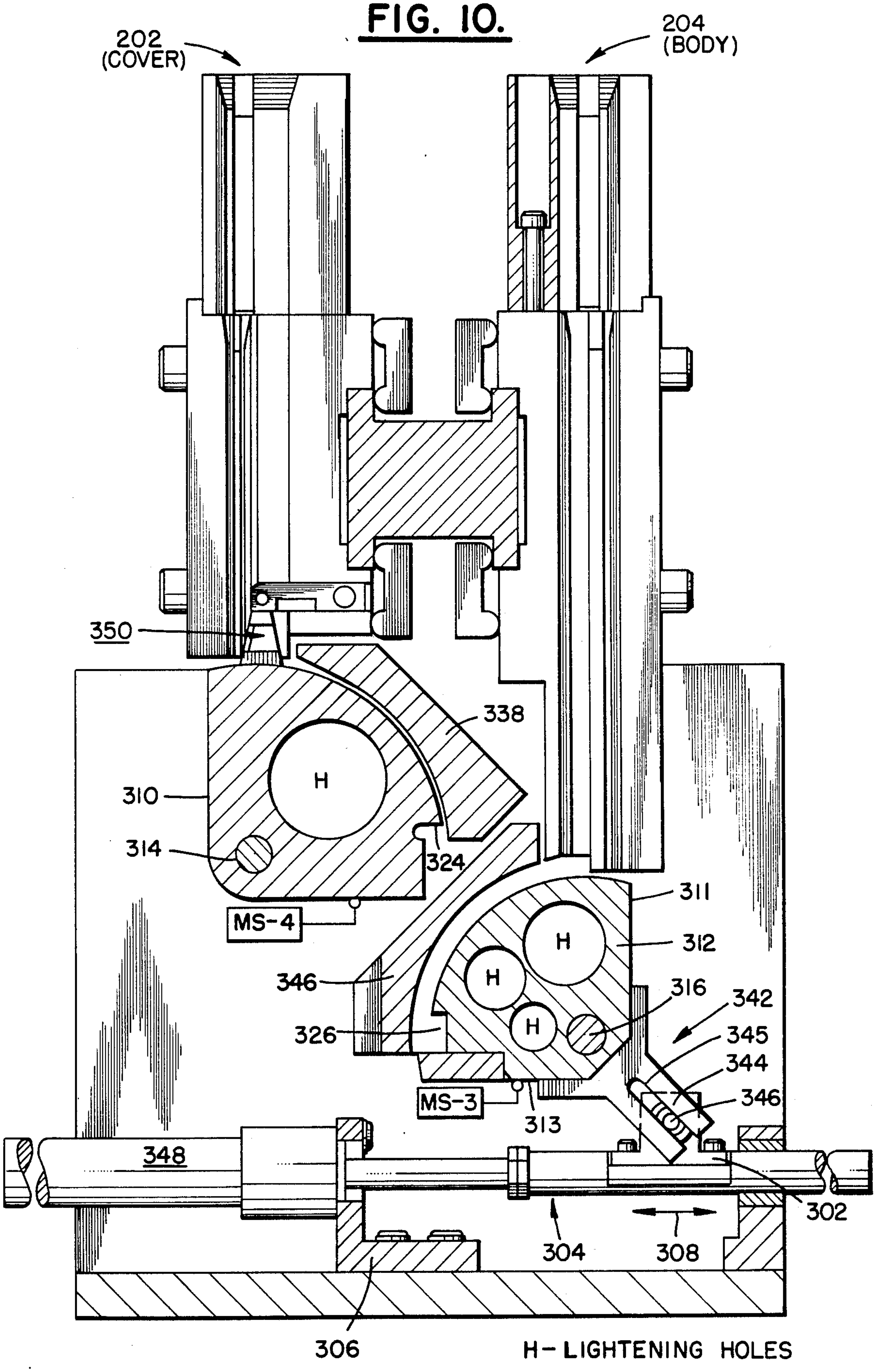
FIG. 10 is a schematic illustration of the transfer assembly taken from the rear of the system.

FIG. 10 is a schematic illustration of the transfer assembly as viewed from the rear of the system. The cover portion 606 of the connector is reoriented and transferred into a position of alignment with the flat side of the ribbon cable and cable-facing side of the body portion by cover transfer member 310. Body portion 608 of the connector is reoriented and transferred by body transfer member 312 into a position in alignment with the opposite flat side of cable and cable-facing side of the cover portion 606. FIG. 10 does not show the cover portion 606 and body portion 608 of the connector. It is noted that in this embodiment of the apparatus, cover transfer member 310 is located above body transfer member 312 in that the final orientation of the cover and body portions places the cover portion over the body portion before assembly to the ribbon cable, also not shown in this view.

Transfer members 310 and 312 are mounted on and turned with shafts 314 and 316, respectively. The shafts are mounted for rotation on the main frame of the machine, not shown, and the appropriate turning motion of shafts 314 and 316 to operate transfer members 310 and 312, respectively, through their cycles is provided.

Figure 11A:
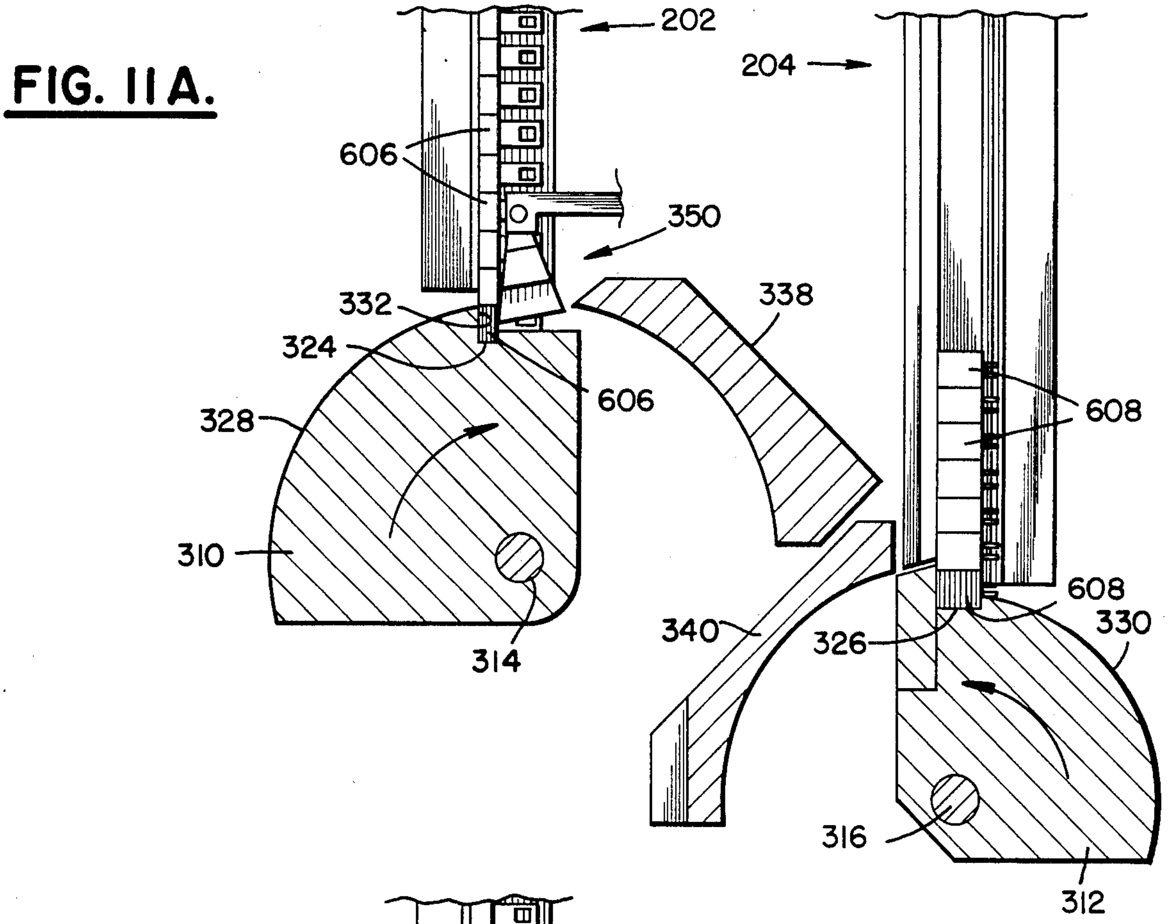
FIG. 11A is a schematic illustration of the positions of the transfer members as viewed from the rear of the system as they are positioned in their respective loading positions just before the connector cover and body portions are rotated thereby.
Figure 11B:
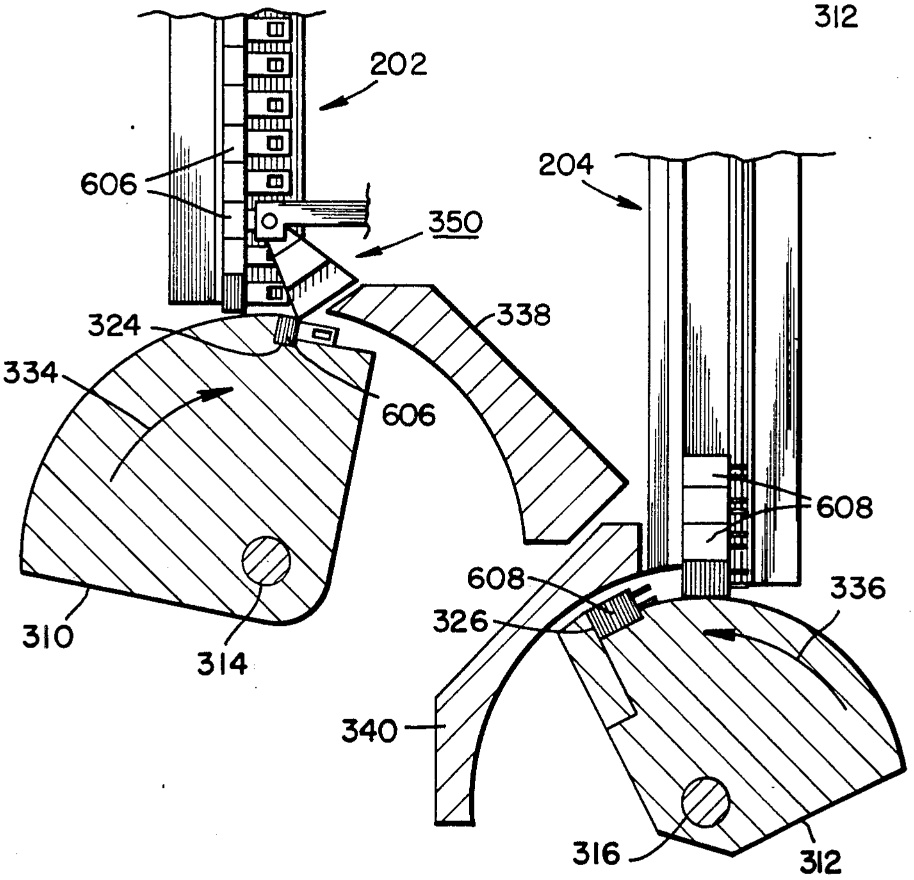
FIG. 11B is an illustration similar to FIG. 11A but just after the transfer members begin to rotate the connector cover and body portions from their respective loading positions towards their respective unloading positions.
Figure 11C:
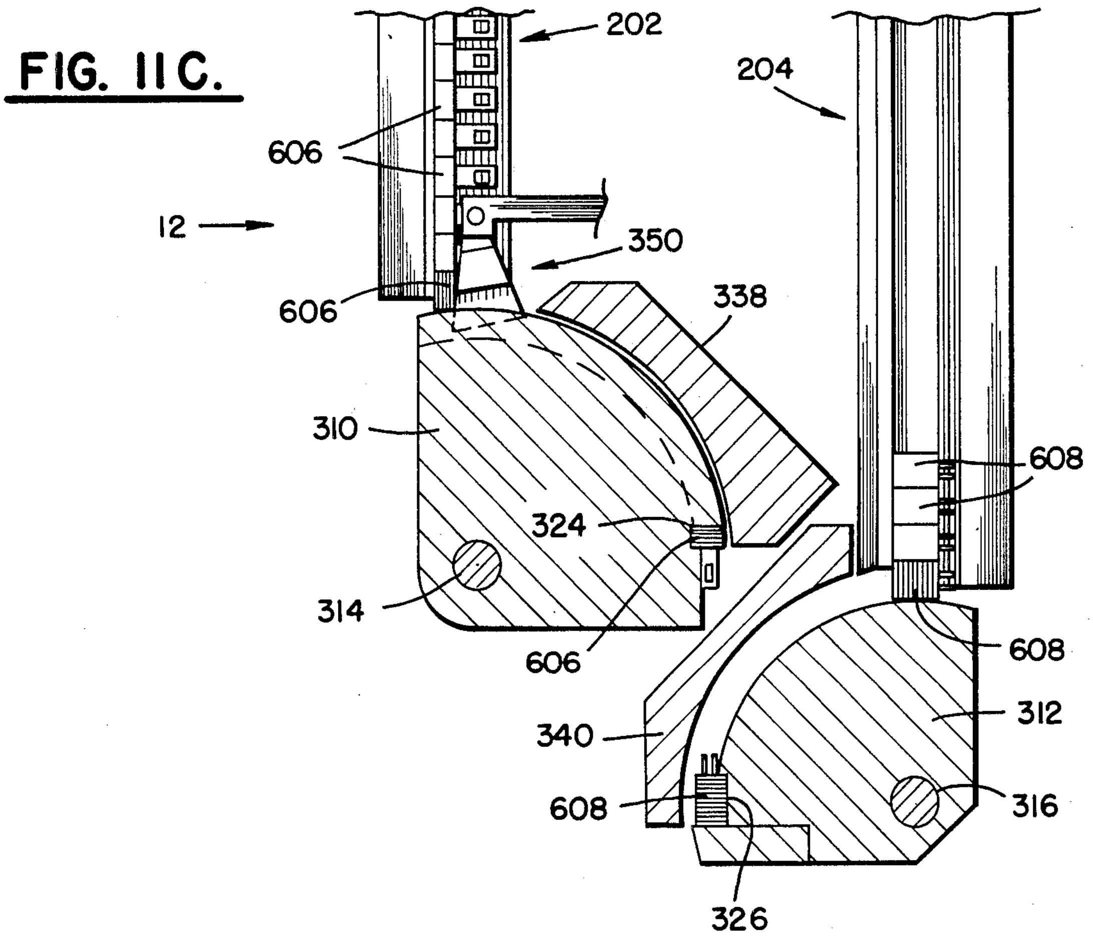
FIG. 11C is an illustration similar to FIGS. 11A and 11B but after the connector cover and body portions have arrived in their respective unloading positions.

The operation of the transfer members in conjunction with the cover and body magazines is described in sequence in FIGS. 11A–C. FIG. 11A shows the loading positions of the transfer assembly, the positions of the cover transfer member 310 and body transfer member 312 before the connector cover portion and body portion are rotated from the lower end of the magazine thereby. The purpose of the transfer members is to receive or capture the cover and body portions from the magazines and reorient them, respectively, into positions of alignment with each other and the cable at the installation station so that they can be installed onto the ribbon cable. In the embodiment shown, this requires that the cover and body portions, respectively, be brought into vertical alignment from the spaced relationships they have due to their original positions in their magazines so that their proper surfaces or edges are associated relative to each other to be properly installed on a ribbon cable located therebetween. In the embodiment shown, the transfer member 312 which carries the body portion is lower than transfer member 310 which carries the cover portion. It should be understood that this is not in any way a limitation in the system since such relationships and positions can be varied dependent upon the particular application. For instance, cover portions could be placed on the lower transfer member 312 with slight modifications thereto in order that the cover and body portions can be reversed on the ribbon cable. Such modifications are conceivable and fall within the purview of the present invention. It should be appreciated, however, that the present invention contemplates for its preferred embodiment that cover portions, or for that matter body portions, be selectively placed by an operator on opposite sides of a cable simply by flipping or inverting the cable at the work station between coupling cycles.

The column or stack of cover portions 606 located in cover magazine assembly 202 is located relative to transfer member 310 so that the lowermost cover in the stack is engaged by retention cavity 324 of cover transfer member 310. This retention cavity is recessed from surface 328 of cover transfer member 310. Likewise, body transfer member 312 contains a retention cavity 326 which retains the lowermost body portion 608 in the stack of bodies 608 in body magazine subassembly 204 while the retention cavity is therebelow. The retention cavity 326 is also recessed from surface 330 of body transfer member 312 as shown in FIG. 11A.

As shown in FIG. 11A, a pendulum assembly 350, an optional feature, is adapted to retain the cover portion 606 against shoulder 332 until the cover portion has fallen fully into retention cavity 324. The use of a retaining means, such as the pendulum subassembly, is desirable since the connector portions are so extremely light in weight. Without such a pendulum subsystem, the connector portions run the risk of being misaligned on the cover transfer member 310 which could cause a jam in the machine somewhat later in the process. The operation of the pendulum subassembly will be described in greater detail hereinafter.

FIG. 11B is the same apparatus as shown in FIG. 11A but at a time just after the respective transfer members begin to rotate the connector cover and body portions towards their unloading positions which is shown in FIG. 11C. The direction of rotation of the transfer members is shown by the arrows thereon. Arrow 334 shows that during this stage of the transfer cycle, cover transfer member 310 is rotated in the clockwise direction thereby bringing cover portion 606 retained within retention cavity 324 towards the unloading position.

It can be seen that pendulum subassembly 350 is pushed out of the way so that cover portion 606 on transfer member 310 can readily slide by the pendulum assembly towards its unloading position. FIG. 11B also shows that body transfer member 312 rotates counterclockwise direction, simultaneously with the rotation of transfer member 310, to bring body portion 608 retained by retention cavity 326 to its unloading position. The directions of rotation at this stage of the transfer member cycle is shown by arrow 336. During the transfer phase of the transfer members cycle, cover portion 606 and body portion 608 are retained on their respective transfer members by virture of fixed shrouds 338 and 340. Thus, as the cover 606 and body 608 move in their respective paths, they kept in their respective cavities 324 and 326 by shrouds 338 and 340, respectively, until they reach their unloading positions.

As can be readily understood from the foregoing description and from an inspection of the drawings, particularly FIGS. 3, 10 and 11A–C, the exterior cylindrical surfaces of the transfer members act to seal off the bottoms of the magazines during the rotation of these transfer members. This action prevents the next cover portion and body portion from dropping from their magazines until the transfer members complete their cycles of operations and again present their empty retention cavities to the locations immediately beneath the magazines for the receipt of the next cover and body portions to be transferred.

FIG. 11C depicts the positions of transfer members 310 and 312 in their respective unloading positions. It can be seen that cover portion 606 in this position has been brought in the clockwise direction to the full extent of this phase of the transfer cycle while body portion 608 has been brought in the counterclockwise direction to the full extend of its rotation by transfer member 312. It is in the positions shown in FIG. 11C that the cover portion 606 and body portion 608 are for the first time properly aligned with one another, although not with the cable, in approximately the same plane for installation onto the ribbon cable. The position is such that the cooperating parts between them are in the right orientation for such installation.

As soon as cover portion 606 and body portion 608 reach their relative positions shown in FIG. 11C, they are moved to the installation station 400 by pushers 320 and 322, respectively, as depicted in FIG. 3. Once the cover and body portions 606 and 608 have been pushed forward out of their respective transfer members to the installation station and pushers 320 and 322 have been retracted to their home positions, as shown in FIG. 3, transfer members 310 and 312 can be rotated in the opposite directions, counterclockwise and clockwise, respectively, back to their loading positions as shown in FIG. 11A to pick up other portions from the magazines.

The positions of the transfer members as shown in FIG. 10 are substantially that which they assume in their unloading positions at the end of their reorientation cycles. FIG. 10 shows this apparatus without connector portions in the magazine assemblies 202 and 204 or in the transfer members. It is these positions shown in FIG. 10 that the transfer members assume before a production cycle occurs in which harnesses are made by the semi-automatic system. Thus, when the first harness is to be made in a production run in this embodiment, the transfer members should be first passed from the position shown in FIG. 10 up to their loading position as depicted in FIG. 11A to receive connector parts in their respective retaining cavities. Then, they are moved in the reverse direction to bring those connector parts down to the unloading position, as shown in FIGS. 11B and 11C, to provide connector portions for the first connector to be established onto the ribbon cable. From this point on, the transfer members rotate back to their positions as shown in FIG. 11A, pause briefly, then rotate back to their positions as shown in FIG. 10 each time the machine is cycled. Thus there is always a fresh body and cover poriton in the transfer members at the unloading positions waiting for the pusher means 320 and 322 at the start of each cycle.

The rotation of transfer members 310 and 312 can be effected by any suitable mechanism. For instance, each can be rotated by mechanism similar to that shown in FIG. 10 associated with transfer member 312. Attached to transfer member 312 is a bracket 342 containing a yoke portion 344. The frame of the machine has a system bracket 306 attached thereto. System bracket 306 contains double-acting piston 348 which activates piston rod assembly 304 so that it reciprocates in the directions shown by arrows 308. Piston rod assembly 304 has attached to it arm bracket 302 which in turn has arm 346 attached thereto. Arm 346 travels in slot 345 of yoke 344.

As piston rod assembly 304 is actuated to reciprocate back and forth by piston 348, arm 346 also moves back and forth in the same direction. As this occurs, the movement of arm 346 is followed by slot 345 and causes transfer member 312 to rotate in a direction depending upon the direction of movement of piston rod assembly 304.

FIG. 10 shows the arm 346 in its position orienting transfer member 312 in its unloading position. Thus, as arm 346 is moved to the left, arm 346 forces itself along slot 345 thereby forcing bracket 342 and transfer member 312 attached thereto to rotate in a clockwise direction to bring retainer cavity 326 under body magazine assembly 204 to load body 608 therefrom. The transfer member 312 eventually reaches its loading position which can be regulated by the placement of adjustable stops, not shown, mounted on the machine frame, against which surface 311 of the transfer member can rest.

Upon the loading of a body member onto transfer member 312, the member is then rotated so it places the body portion into the loading position by rotating the transfer member in the counterclockwise direction. This is accomplished by double acting cylinder 348 moving the piston rod assembly 304 to the right, as shown in FIG. 10, to bring arm 346 back to the position shown in FIG. 10. A similar arrangement acting in unison with that shown in FIG. 10 can be applied to transfer assembly 310 in order to move it in the manner described hereinabove. When transfer member 312 reaches its unloading position, it can be located precisely in that position by stop, not shown, against which surface 313 comes to rest. This stop can also be adjustable.

Figure 12:
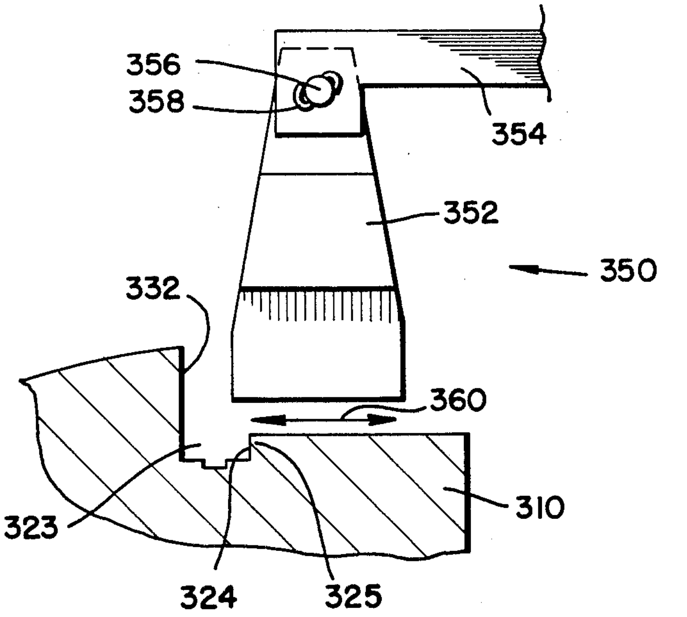
FIG. 12 is an illustration of the pendulum subassembly.

A more detailed view of the pendulum subassembly shown in FIG. 10 is schematically illustrated in FIG. 12. The pendulum is shown over transfer member 310 adjacent retention cavity 324 and should 332, but without a column of cover portions in the adjacent cover magazine subassembly 202 or in retention cavity 324 or in transfer member 310. The purpose of the pendulum subassembly is to act as an additional temporary guide to assure that the cover portions fall fully into groove 323 and do not hang up on corners 325. It is temporary in that it pivots out of the way as the cover transfer member rotates.

The pendulum basically operates under its own weight which, under the force of gravity, tends to keep it in the position shown in FIG. 12. The pendulum subassembly includes pendulum member 352 which contacts the cover portions held by transfer member 310 within the position shown in FIG. 12. Pendulum member 352 is supported from pendulum bracket 354 which is in turn fixably mounted to the frame 50 of the machine. The connection of the two parts is through pin 356. The pin is mounted to pendulum 352 so that it may freely rotate relative to bracket 354. The pin 356 is a free fit through pendulum 352 and through both brackets 354 so that the pendulum may freely rotate with respect to the brackets 354.

Optionally, there may be a spring biasing means 358, such as a steel wire, acting as a spring to keep pendulum member 352 biased towards the connector part thereby holding the connector part in place before the transfer member begins to rotate it to the unloading position. As such rotation begins, the pendulum member 352 is rotated in the counterclockwise direction about pin 356 to provide clearance for the cover member retained within retention cavity 324 to begin its clockwise rotation into its unloading position. Pendulum 356 is pushed out of the way in the counterclockwise direction until the cover member passes it as transfer member 310 is moved from the loading to the unloading position in the clockwise direction.

After the cover portion clears the pendulum member 352, the pendulum member is brought back to the approximate position shown in FIG. 12 due to the weight of the pendulum member 352 as well as the action of spring bias 358, if the spring is used in the system. The return of the pendulum to the position of the FIG. 12 occurs as the pendulum swings in the clockwise direction to reach this position from its extreme counterclockwise position immediately prior the passage of the cover portion. Arrow 360 shows the directions with which pendulum member 352 can rotate about pin 356 on arm bracket 354.

After the transfer members have placed the cover and body portions of the connector in their unloading positions, cover pusher mean 320 and body pusher means 322 are activated from their home positions as shown in FIG. 3 and are moved towards termination station 400. During this process, cover pusher means 320 contacts the rearward facing edge of cover portion 606 and body pusher means 322 contacts the rearward facing edge of body portion 608 to push the cover and body portions out of their respective transfer members and into the installation station 400.

The orientations of the cover and body portions as they reach station 400 is depicted also in FIG. 3. The cover portion 606 and body portion 608 come to rest in the termination station 400, as will be described in greater detail hereinafter, at which time cover pusher means 320 and body pusher means 322 are retracted to their home positions as shown in FIG. 3. As soon as these pusher means are retracted towards their home position far enough to clear transfer members 310 and 312, the transfer members can be rotated back to their loading positions to pick up the next pair of connector portions. The transfer members 310 and 312 have no obstruction or retaining means which would interfere with the pushing of the cover and body therefrom by the pushing means. Once the cover portion 606 and body portion 608 arrive in the termination station 400, the downward stroke of the ram 130.

A front view of the installation station 400 is depicted in FIG. 6. The installation station contains, inter alia, a press assembly 100 which includes ram means 130 and anvil means 110. As can be seen from FIG. 3, the cover portion 606 of the connector is placed in ram means 130 while body portion 608 of the connector is place on anvil means 110 of press assembly 100 by pushers 320 and 322 when these parts arrive in termination station 400. Located adjacent and between the ram means 130 and anvil means 110 is a platen assembly 120 upon which the ribbon cable can be placed and aligned for the connector portions to be attached thereto, as shown in FIG. 6.

FIG. 6 also shows that anvil means 110 contains a nest subassembly 410 for capturing and locating the body portion 608 of the connector as it is received by the termination station and delivered by body pusher means 322. The next subassembly 410 is fixedly located on anvil means 110. Nest subassembly 410 contains nest member 412 which is adapted to receive the body portion 608 of the connector prior to installation onto the ribbon cable.

Any suitable type of nest means can be used to capture the body in the anvil means 110. For instance, FIGS. 13, 13A, 13B, 13C, and 13D represent a suitable nest for this purpose. The nest is made of a suitable material which can withstand the stresses placed thereon during the connection process and which maintains its dimensional stability. The nest assembly 404 has a body cavity into which the body portion 608 of the connector is placed by pusher means 322 through entrance of the nest. The nest assembly 404 is mounted on the machine through fixedly positioned left nest block 405 and right nest block 406, respectively. Reciprocally mounted on upper inner cut away sections 407 thereof are the left hand and right hand nest guides 408 and 409, respectively. An anvil 410 for supporting body portions to be coupled is fixedly positioned on the machine frame between the left nest block 405 and left hand nest guide 408 and, on the other side of the anvil, the right nest block 406 and right hand nest guide 409.

Each nest guide is mounted all one piece to the top of a vertical support arm 412 with a screw 413 and pin 413*a*, the lower end of each support arm being formed with a recess 414 to receive the upper end of a coil spring 415, the lower end of each spring being supported by the machine frame. The support arm and spring for each nest guide are located in a matching slideway 416 within the nest block to thereby allow each nest guide to be independently reciprocated downwardly under the force of the ram during the coupling of the connector portions to a cable and to be spring urged upwardly after the coupling force of the ram has been removed. The support arm 412 is a sliding fit within the four sided slideway formed by slideway 416 and the corresponding side of anvil 410. Thus, support arm 412 provides proper position of the nest guide and allows it to smoothly reciprocate up and down. The reciprocating action may also occur during the positioning of cables at the work station by an operator, as during the alignment of a cable end.

After installing a connector to a cable, the ram will move upwardly removing the downward pressure from the nest guides. As a result, the nest guides will be spring urged to move upwardly to raise the cable and connector away from the anvil and out of the nest assembly. This increases productivity by making it easier and faster for an operator to remove the cable with its connector and prepare the cable, or a new cable, for positioning on the platens to receive the next connector.

To stop the upward movement of the nest guides during their reciprocation, edge recesses 417 are formed into the exterior surfaces of the nest guides. These recesses are of such a size and orientation to receive stop blocks 418 fixedly mounted by bolts 419 in recesses 420 on the upper surfaces of the nest blocks.

The upper surface of each nest guide is fabricated at its interior side so as to form an upwardly extending lip 421 for the reception of the interior ends of the cable supporting platens 630 and 640 at the work station. The facing interior surfaces of these lips constitute the abutment surfaces 422 utilized by an operator during the positioning of a cable at the work station for the application of end connectors. This abutment surface permits an operator to appropriately align either preselected end of a cable to the appropriate lip abutment surface of the nest guide corresponding to the end of the cable which is to receive the connector.

Figure 20:
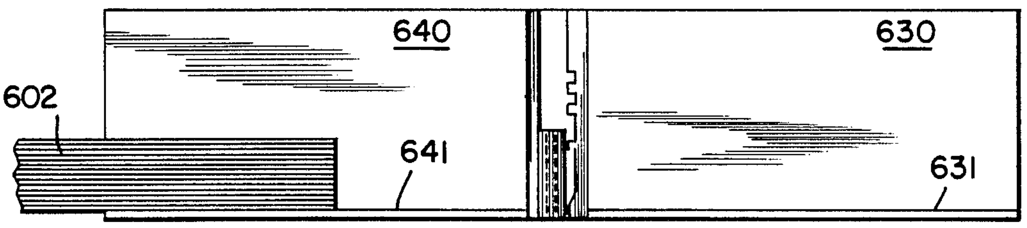
FIG. 20 is an illustration of the platen assembly as viewed from the top.
Figure 20A:
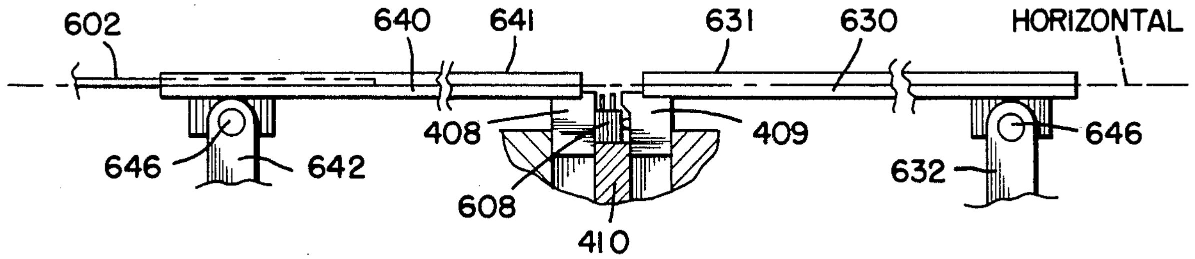
FIGS. 20A–C are front views of the assembly shown in FIG. 20 depicting the platens in approximately a horizontal or normal orientation, in a depressed orientation, and only the left platen in a depressed orientation, respectively.
Figure 20B:
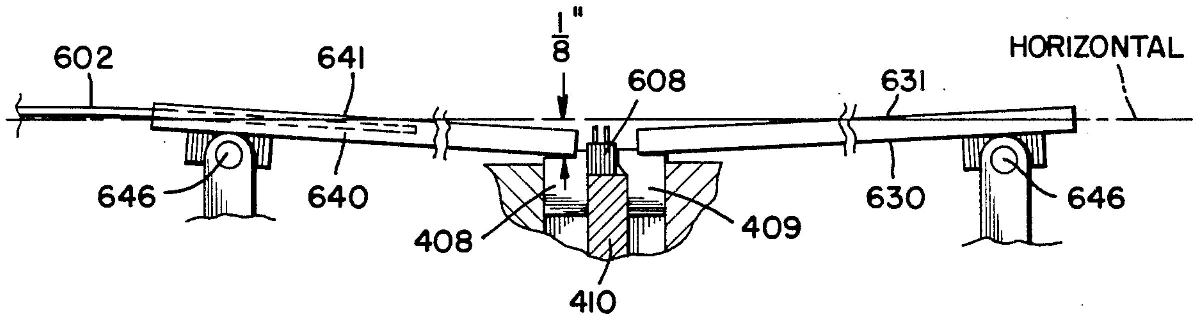
Figure 20C:
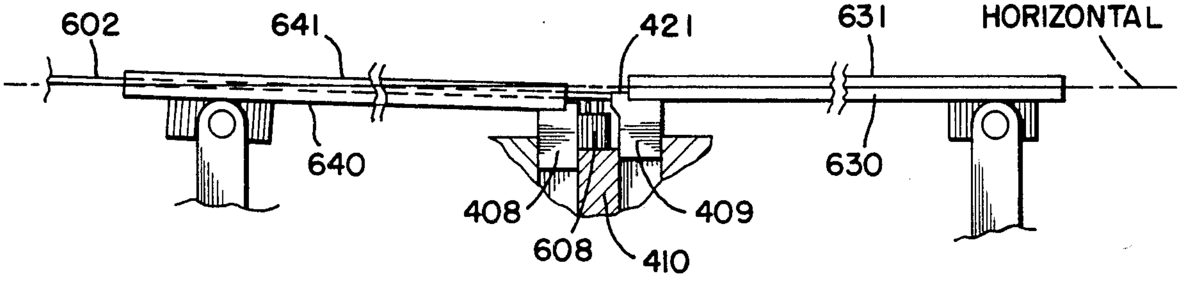

As seen for example in FIG. 6 and FIGS. 20–20C, the left hand nest guide has a planar interior surface, the lower portion thereof being adapted to contact and guide the edge of a cover portion as it is slid by the pusher means into position for the coupling operation. The upper segment of the inner surface is adapted to slide downwardly during the coupling operation in constant sliding contact with the edge of the body portion which is fixedly positioned on the stationary anvil.

Figure 13:
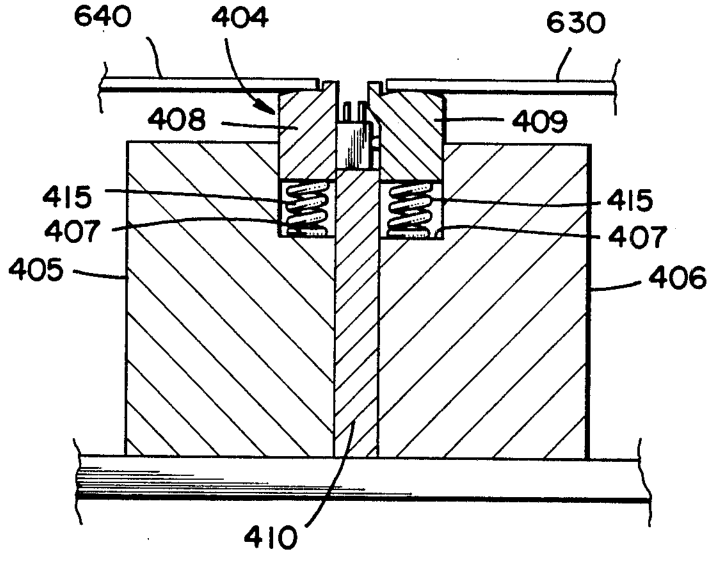
FIG. 13 is a diagramatic view of the nest assembly with a body portion in place for coupling to a cable as viewed from the front of the machine.
Figure 13A:
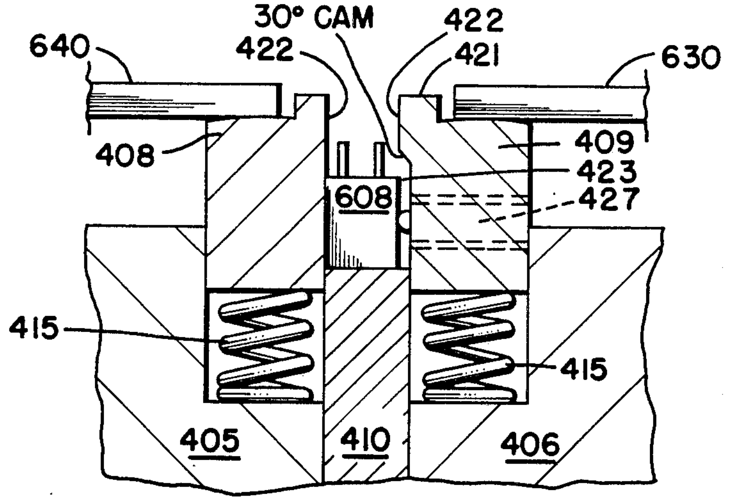
FIG. 13A is an enlarged diagrammatic view of the nest showing the right nest guide with detent means.
Figure 13B:
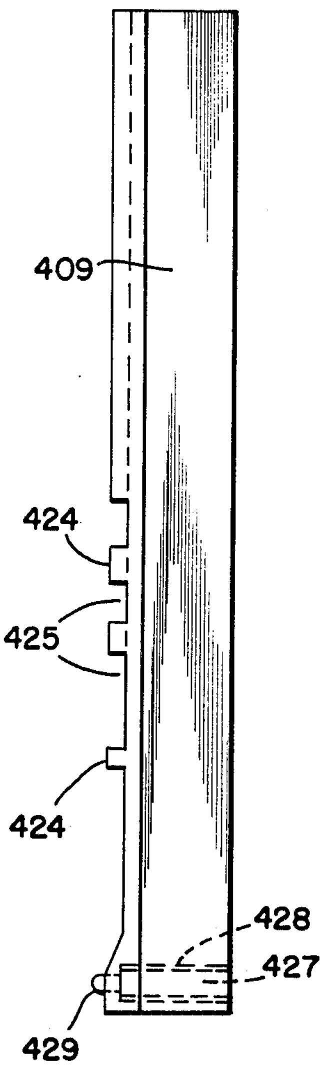
FIG. 13B is a top view of the right nest guide in FIG. 13A showing the keyways and detent means.

The right hand nest guide, unlike the left hand nest guide, is fabricated to form a cut-away recess 423 along the lower extend of its length. This is necessary in order that the machine may couple connectors with keys as well as connectors without keys. Keys are rectangular projections on the body portions of certain connectors to facilitate their subsequent incorporation into further electrical components. Keyways 425 are those cut-away sections along the upper extend of the right hand edge guide to accommodate keys on body portions of connectors being coupled with cover portions to cables. As can be seen in the Figures, particularly FIGS. 13 and 13A–D, body portions are slid into position for the coupling operation by being slid by the pusher means 322 while in contact with the left hand nest guide and the anvil but out of contact with the right hand nest guide only when the particular body portion is not provided with a key. As shown in FIG. 13*a*, the right nest guide abutment surface 422 is angled downwardly into the surface of aforedescribed cavity 423. This angled surface which appears on each key portion 424 serves as a cam to slide the connector bodies without keys over and against the left hand nest guide.

During the coupling operation, the ram supporting a cover portion will move both nest guides downwardly to allow a cover portion to mate with a body portion and thereby effect the coupling operation. As the right hand nest guide moves downwardly, the land portions 424 of the right hand nest guide, those areas on the upper portion of the nest guide between the keyways 425, will contact the slide of the body portion to assist in the secure holding and accurate positioning of the body portion during the coupling of the cover and body portions to the cable. The keys are always centered along the length of one side of the body portion. The keyways of the present invention are fabricated so that land portions of the right hand nest guide will always be present on both sides of the key for increased securement and support of any keyed body portion within the nest assembly during the coupling operation. This occurs regardless of the type or length of body portion being coupled and regardless of the position of the key with respect to the keyways.

In those instances where the body portions with keys are to be coupled, the operations will be essentially as described above except that the keyways will allow the right hand nest guide to travel downwardly and then upwardly without interfering contact between the keys of the body portions and the land sections of the nest guide. This is because the keyways are positioned and sized with respect to all standard keys to permit this above described movement of the nest guide and keyways with respect to the fixed portion regardless of the type of standard key thereon.

An end plate 426 is fixedly secured to the nest blocks and constitutes an abutment surface for stopping the movement of the pusher member as it delivers a body portion to the nest assembly.

An additional feature of the right hand nest guide is the presence of a spring loaded detent 427 located in an aperture 428 of the nest guide adjacent the end plate. The detent has an exposed projection 429 positioned to be contacted by a body portion moving into position in the nest assembly. The body portion acts to urge the exposed projection inwardly while an internal spring acts to urge the exposed projection outwardly. The spring loaded detent operates in association with the end plate so that it initiates the deceleration of the moving pusher and body portion and, more importantly, provides a holding force on the positioned body portion to preclude it from moving out of contact with the end plate and left hand nest guide prior to, as well as during, the coupling opertion. Without such spring loaded detent, there would be a tendency for the body portion to ricochet away from the end plate due to the force of the pusher driving the body portion into position in the nest assembly.

During the normal operational sequence, the next cover and body portions to be coupled are in the reorientation or transfer members adjacent the pushers. There should never be a body portion in the nest assembly at the time of initiation of a cycle. If a body portion were to inadvertently be in the nest assembly at the initiation of a cycle, a jam would occur, possibly with attendant damage to the machine as well as to the body portion. The present sequence allows an operator to inspect the nest assembly and to remove any body portions as slowly and carefully, or as quickly, as deisred in the normal mode of operation it is intended that there should be no operator disturbance of a body portion once it is conveyed to, land positioned, the nest assembly during the normal and automatic mode of operation. It is also noted that a body portion to be coupled rests in the nest assembly at a sufficient distance below the plane of the cable to receive the connector. Hence, it is unlikely for a cable to disturb the position of the body portion as it is automatically transported into the nest assembly.

The cover portion of the connector is pushed into the ram assembly of the system by pusher 320 preferably at about the same time that the body portion is pushed into the nest. The front sides of transfer member 310 and 312, the sides closest to the installation station, are located closely adjacent the nest and ram assembly so that as the pushers push the cover and body portions out of the transfer members, they slide right into the nest and ram assembly. Alternatively, a space could be left between the transfer members and nest and ram assembly and a suitable means such as a guide could be used to carry the connector portions therebetween.

The alignment of the body connector in its nest assembly as well as its alignment relative to the cover portion of the connector is most important to avoid short circuits which could occur upon improper assembly of the connector portions onto the ribbon cable. For instance, such alignment generally must be within 0.005 inch tolerance. Such alignment must also take into account the closely spaced conductors within the ribbon cable. Connector parts are pushed into the shoe portion of the press assembly and the nest with an air cylinder pressure, such as about 25 psi, to a positive stop. The stop is provided in the nest and ram assembly. The air cylinder has a pressure sensor and both pusher means 320 and 322 must come to a certain, predetermined pressure before the next action. These pressure conditions act as a pressure switch and once activated by the pressure being reached, the connectors are in position, and only thereafter can the pusher means 320 and 322 retract to their home positions.

Figure 14:
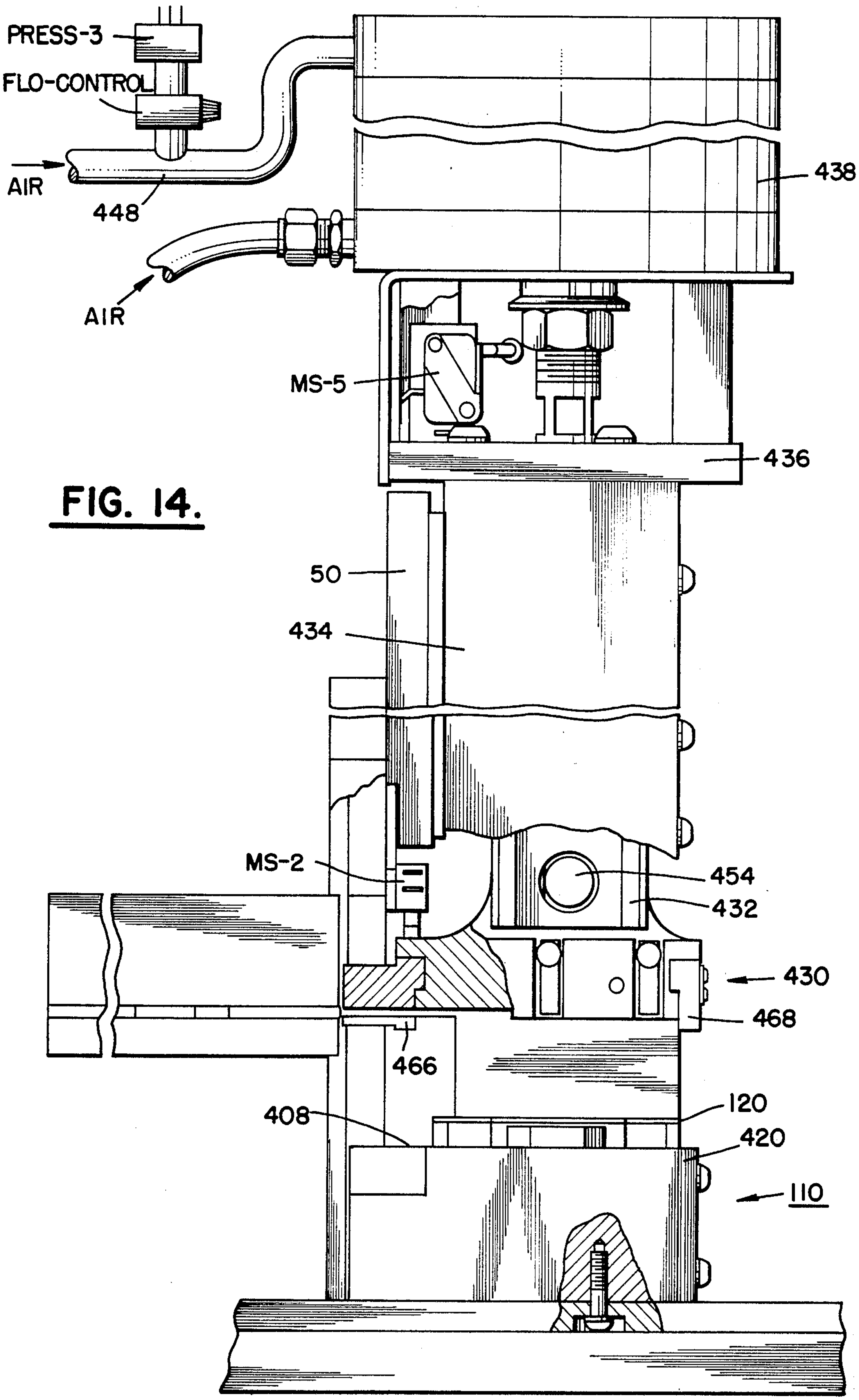
FIG. 14 is a partial section of FIG. 5 taken along section 10—10 showing a side view of the press assembly.
Figure 15:
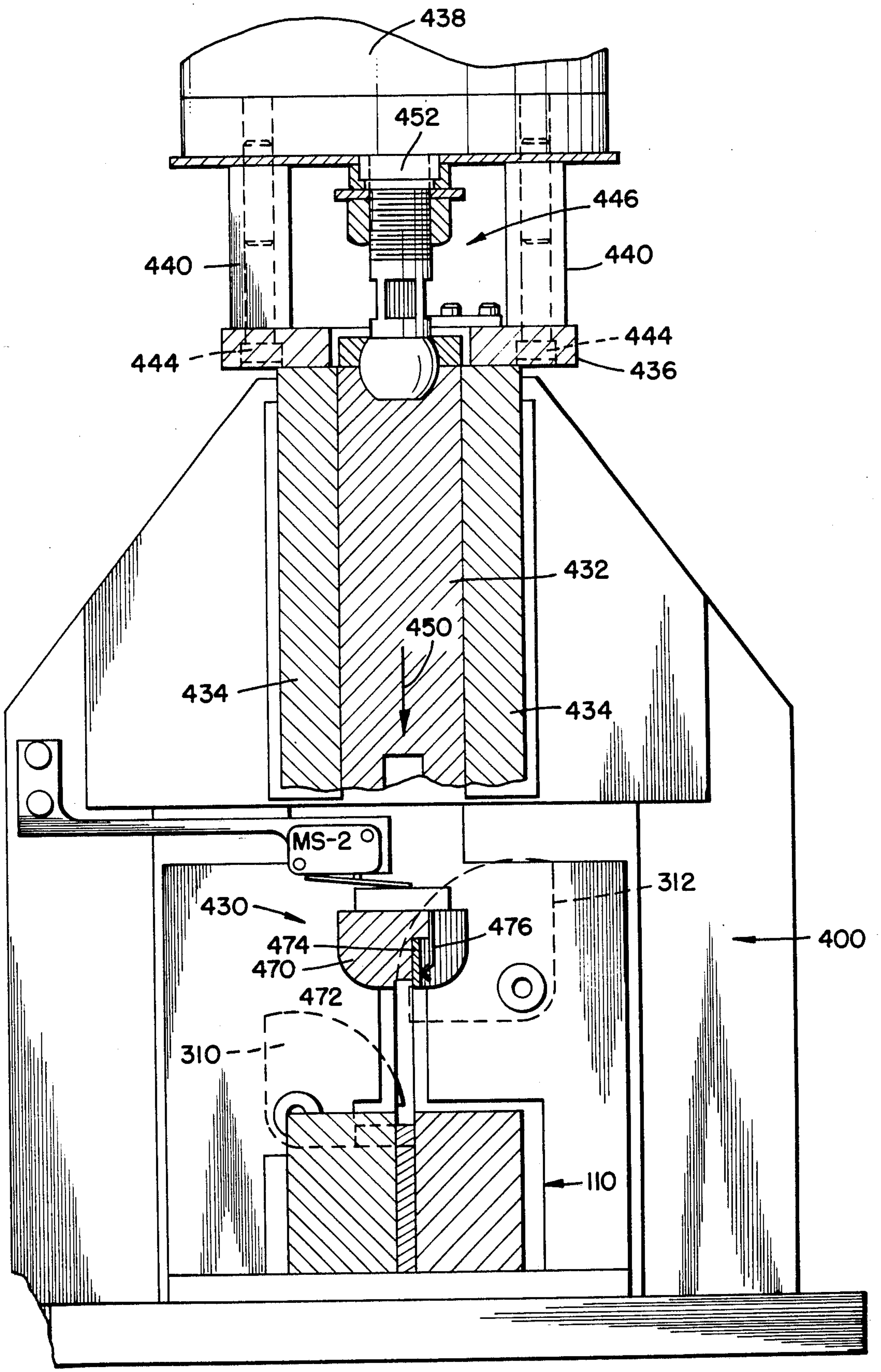
FIG. 15 is a partial section of FIG. 4 taken along section K—K showing a front view of the press assembly.

FIGS. 14 and 15 show more detailed views of the ram means 130. FIG. 14 is a section view of FIG. 5 taken along section 10—10. FIG. 15 is a section view of FIG. 4 taken along section K—K. FIG. 14 shows the general layout of the press relative to anvil means 110 and platen assembly 120. The ram means 130 has a ram shoe assembly 430 attached to ram 432. As can be seen from FIG. 15, the ram shoe assembly 430 is adapted to drop from its elevated home position, shown in FIG. 15, relative to ram guides 434, which are fixed to the machine frame, in a direction towards anvil means 110 as shown by arrow 450. By so dropping, the press accomplishes the installation of the cover contained by the ram shoe assembly 430, not shown in these Figures, onto the cable and body portion of the connector. As shown, most clearly in FIG. 15, ram guides 434 have a ram guide frame member 436 which in turn have spacer members 440 which are fixedly attached to air cylinder 438. The ram 432 is connected to the piston, not shown, of air cylinder 438 by connector assembly 446. The piston rod 452 of air cylinder 438 is connected to ram 432 by connector assembly 446. As the air cylinder 438 is activated in a fashion to drive the ram down from its elevated home position, shown in FIG. 15, towards the anvil depicted by arrow 450, the connection is made.

The ram drops until a certain predetermined pressure is apparent on the ram as indicated by a pressure sensor connected with the air line feeding air cylinder 438. Once the pressure is accomplished, the ram has reached a full extent of its downward cycle and the double-acting cylinder 438 is switched to bring the ram back up to the home position shown in FIG. 15 to complete one cycle of installation of connector portions onto ribbon cable at the installation station 400.

Figure 16:
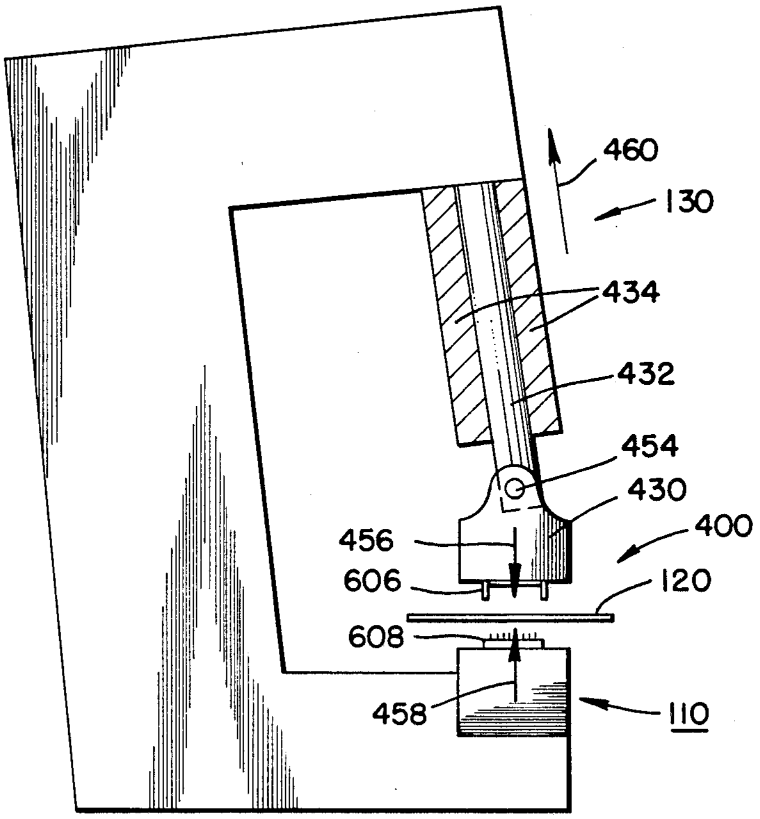
FIG. 16 is a view showing, in an illustrative manner, the pivot action on the press shoe assembly for keeping the connector parts in alignment to counteract any undesirable press opening effect during the termination process.

As shown in FIG. 14, ram shoe assembly 430 is mounted for a limited amount of pivoting relative to ram 430. As seen in the schematic illustration shown in FIG. 16, the press and anvil form a "C shape" around the installation station. Thus as the ram 432 and the ram shoe assembly 430 are driven down onto anvil means 110 with some force, shown as force vector arrow 456, there is an equal and opposite reaction force provided by anvil 110, as shown by force vector arrow 458. This reaction force is translated through the ram and frame member of the harness maker so that the reaction force is placed on the upper part of the "C shape" of the apparatus as shown by force vector arrow 460. This reaction force tends to open up the "C shape" tilting the ram means 130 upwards.

Any such force driving the ram means 130 to open up the mouth of the "C" in this fashion will also tend to misalign the cover relative to the cable and body portions when the connection is made. This is undesirable in that such misalignment can cause mechanical jams, electrical shorts, improper completion of the installation, bad or no connections between individual parts, etc. Thus, to alleviate this type of misalignment, ram shoe assembly 430 is mounted on ram 432 through pivot member 454. As the connector portions are being installed onto the ribbon cable, the ram shoe assembly 430 is nevertheless enabled to keep the surfaces of the cover aligned with the cable and body portions of the connector by virture of pivot 454 even though ram 432 tends to force itself out of alignment with respect to the anvil due to the reaction force 460 during the installation process.

The ram shoe assembly 430 is always biased so that it is in alignment with the ram 432 in such a way that the cable-facing surface of the cover portion is parallel to the platen assembly 120, the body portion 608, and the anvil 110. The ram in the embodiment shown applies about 1,000 pounds of force. During installation, the frame will deflect and the installation process of the two connector portions will not allow much more than 0.001 to 0.002 inches deflection. Thus the pivoting feature of the ram shoe assembly enables a slight pivoting of the shoe assembly 430 as needed to keep the cable-facing surface of the cover portion parallel as shown.

As can be seen in the Figures, the pushers 320 and 322 are located with their axes in a vertical plane which includes the axis of reciprocation of the ram. This plane is perpendicular to the plane in which the cable rests in the installation station.

FIG. 15 also shows details of the ram shoe assembly 430. The ram shoe assembly has ram shoe 470 containing a cover portion retention cavity 472. The top and left side of the cover portion retention cavity 472 is formed by the ram shoe member, per se. However, the right side of the cover retention cavity 472 is formed by pusher member 474. Pusher 474 is biased to the left by spring means 476. As a cover member is pushed by the cover pusher member from transfer member 312 into cover retention cavity 472 of shoe 470, the upper edge of the cover portion will slide into the cover retention cavity and will be held therein by pusher 474. Upon initial entrance of the cover into cover retention cavity 472, pusher 474 can be pushed aside against the bias of spring means 476 by the cover portion to a slight degree to provide enough clearance for the cover to pass into the cavity. The cover portion is held in the cavity member by pusher 474 until installation has occurred onto the ribbon cable. It is noted that FIG. 15 is only a partial view of the ram shoe assembly.

Figure 17:
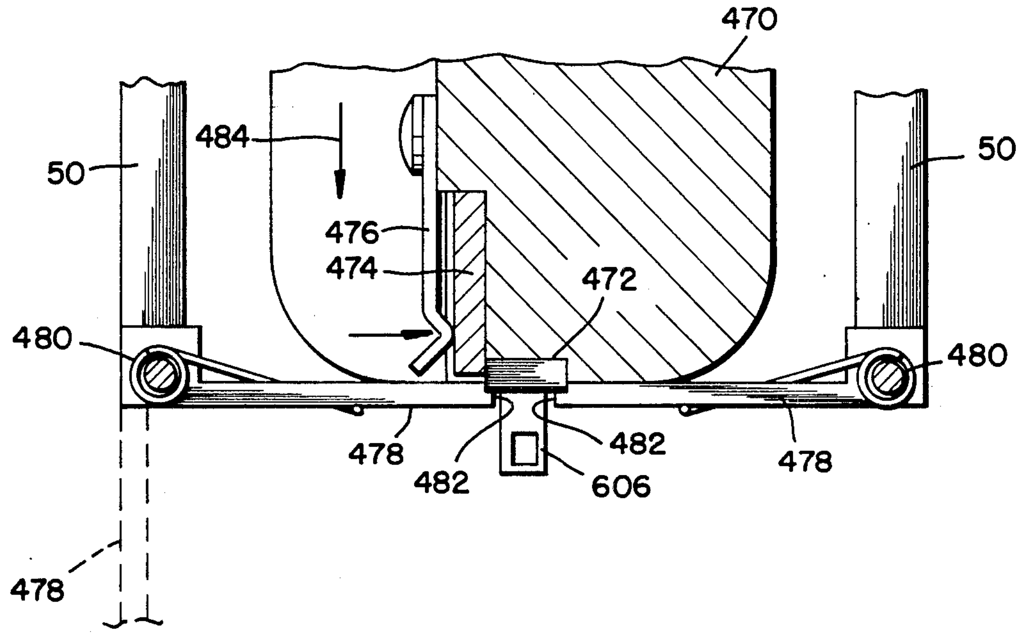
FIG. 17 is an illustration of the ram shoe subassembly as view from the rear of the system in combination with the ram doors.

As an additional feature to guide the cover portion fully into retention cavity 472 of the ram, doors 478 are provided under the cover portion adjacent the lower portion of the ram shoe 470 to perform the guiding. This is shown in FIG. 17. The doors are biased by any suitable spring means such as that depicted in FIG. 17 by reference 480, into the position shown in FIG. 17. The doors each extend nearly halfway across the area beneath ram member 470. Each door has a lip 482 which is under and adjacent the upper portion of the cover member as a safety to guide and keep the cover member in the cavity 472. However, upon activation of the press means 130, ram member 470 is driven downwards as shown by arrow 484 towards the anvil. As this occurs the ram member 470 within ram shoe assembly 430 pushes the doors out of the way against the spring bias provided by spring means 480 to allow the ram to pass.

After the doors have been opened and the cover portion is no longer being held positively by doors 478, the pressure pad 474 exerts ample frictional holding force to prevent cover portion 606 from dropping ahead of the ram during the installation process. After the ram member 470 has passed by the doors, the sides of the ram keep the doors open throughout the installation process until the ram is retracted to its original home position, as shown in FIG. 15, where it is again in position to receive another cover portion from the transfer member 312. When the ram has retracted to its home position, doors 478 are again allowed to be placed in their normal, essentially horizontal position as shown in FIG. 17 due to spring bias 480.

Figure 18:
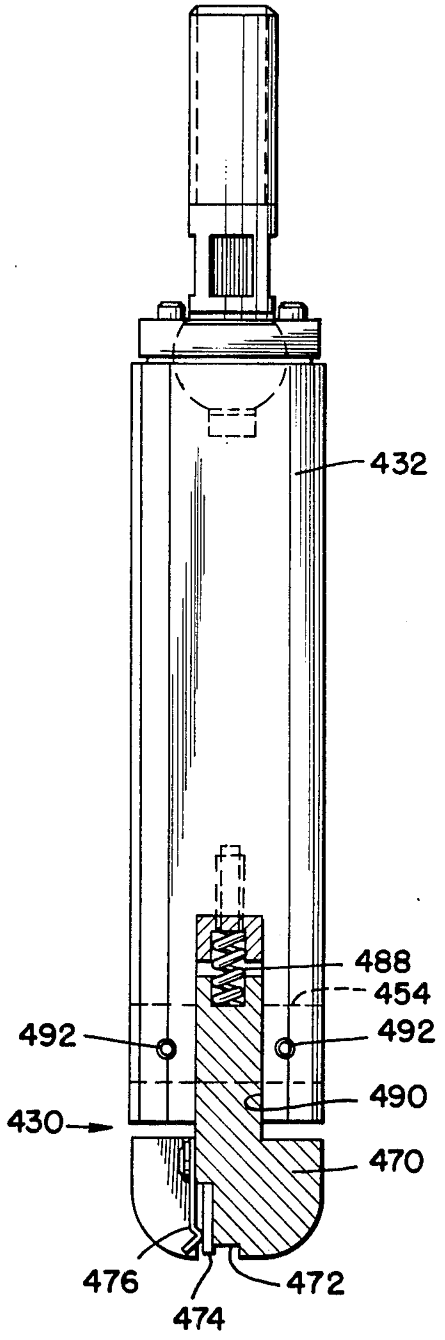
FIG. 18 is an illustration of the ram showing its spring bias arrangement with the ram show subassembly.

FIG. 18 is a view of the ram shoe assembly 430 showing details of the way it is attached to ram 432, as viewed from the opposite side as in FIG. 15. Ram shoe subassembly 430 is attached to the arm 432 by a spring arrangement. As can be seen in FIG. 18, ram shoe member 470 is pressing against spring 488 which in turn is pressing against ram 432. By this arrangement, ram shoe 470 is held against accurately ground surface 455 of ram shoe 453. This surface 455 is ground at assembly to position surface 472, over its entire length, perpendicularly to ram 432. Since ram 432, through its guide 434, is held perpendicularly to anvil 110 and its nest assembly 404 and to platens 120, all by means of main frame 50 and subframe 51, this provides parallel alignment of the cover portion 606 and body portion 608 throughout initial engagement of the cover and body portions 606 and 608. As the ram starts to apply pressure for the connection, and main frame 50 begins to deflect, spring 488 allows ram shoe 470 to pivot and maintain parallelism with anvil 110 and platen 120 as explained previously and as illustrated at FIG. 16.

Figure 19:
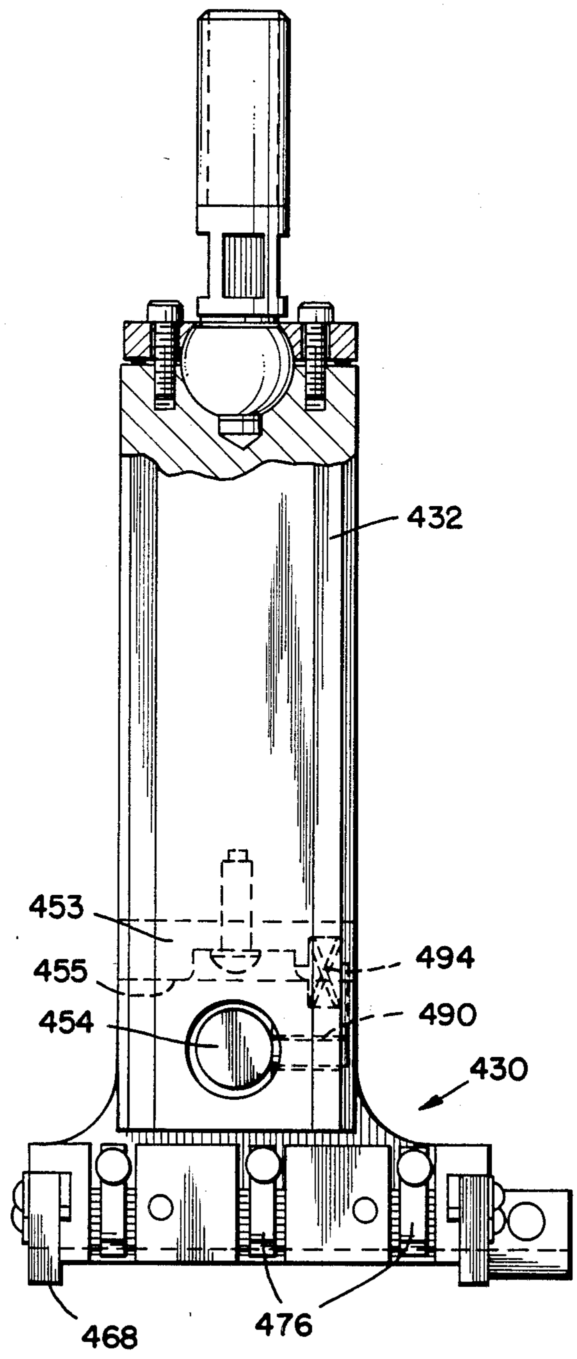
FIG. 19 is a side view of the ram shown in FIG. 18.

FIG. 18 also shows the position of pivot shaft 454 about which the ram shoe assembly 430 pivots in the action just defined. Set screws 490 hold pivot shaft 454 in ram 432. When this has occurred and after the installation of the cover portion has been accomplished and the ram is returning to its home position, spring bias 488 repivots the ram shoe assembly 430 back in the counterclockwise direction in FIG. 19 to the position shown in FIG. 19, its home position relative to the ram 432.

The general arrangement of the platen assembly 120 relative to the terminations station 400 is shown in FIG. 6. The purpose of the platen assembly is to provide a surface upon which the ribbon cable can be placed so that it is generally perpendicular to the force provided by the ram during installations when the cover portion thereon is joined with the body portion. The platen is broken into two portions, a left portion and a right portion as shown in FIG. 6. Each portion is identical but a mirror image of the other. Right platen member 630 is mounted on bracket 632 which is in turn mounted on machine frame 50. Right platen 630 has a frame 634 attached thereto containing pin 636 which is adapted to rotate within hole 638 in bracket 632. Left platen member 640 likewise has a frame 644 containing a pin 646 which rotates within hole 648 about bracket 642 which is also mounted to frame 50.

FIGS. 20 and 20A–C are schematic illustrations of the platen assembly 120 in different portions. As can be seen from FIG. 20, which is a top view of the platen assembly 120, the platens are basically flat surfaces or tables having one end adjacent nest 412. By such a platen arrangement, the operator can easily and quickly locate a ribbon cable to install connectors at any mid-portion of the ribbon cable or to either end of the ribbon cable.

Left platen 640 has a ridge area 641 and right platen 630 has a ridge area 631 which are on the side of the platen nearest the operator who sits in front of the system. When the operator places a section of ribbon cable on either or both platens, he lines up one edge of the ribbon cable against ridge 631 or ridge 641 or both ridges 631 and 641 depending upon the place on the cable that the connector is being installed. The ridge can be any suitable wall or barrier rising above the top surface of the platens and need not be any higher than required to be felt by the operator when the side of the ribbon cable strikes it and is aligned with it.

FIGS. 20A–C represent various orientations of the platens depending upon the installation step that is required. In FIG. 20A, both left platen 640 and right platen 630 are substantially horizontal and their top surfaces are slightly above the uppermost portion of body portion 606. When a connector is to be applied to a mid portion of the ribbon cable, the platens will generally assume this position. This position is also assumed by left platen 640 and right platen 630 as a home position; that is, the position of these platens automatically return to when not depressed or otherwise forcibly moved out of this position by the operator. The platens are returned to these substantially horizontal positions by virtue of a spring 415 upwardly urging left platen 640 and spring arrangement 415 upwardly urging right platen 630.

It is possible to depress either left platen 640 or right platen 630 separately or both platens together as shown in FIG. 20B into the position relative to nest 412 as shown in FIG. 20B. In this embodiment, when the platens are depressed as shown in FIG. 20B, the ends nearest the nest 412 are depressed approximately ⅛ of an inch, the purpose of this being explained hereinafter. The positions of the two platens are shown in FIG. 20C and are arranged by the operator when a edge connector is to be applied to the right hand side of the ribbon cable as will also be described hereinafter.

When the operator wants to make a mid-span connection to the ribbon cable somewhere between the two ends of the ribbon cable, the ribbon cable is laid on top of the two platens with the portion to receive the connector lying over body portion 606 in nest 412. The two platens will maintain their horizontal positions shown in FIG. 20A. The operator will then operate the press to apply the cover by the ram to the cable and body. The operator in this application must be sure that the other edge of the cable is located against ridges 631 and 641 of the platens.

On the other hand, assuming that a connector is to be placed on the right hand portion of a section of ribbon cable, the operator must place the right hand end of the ribbon cable on left platen 640 and align it with the ridge 641 of that platen. The operator should then depress the left platen 641 and slide the right hand edge thereof down the platen towards the right platen 631 until the right side of the cable abuts the left hand side of right nest guide 409. This condition is shown in FIG. 20C.

Thus, by placing the cable in the above-described orientation on left platen 640, the end of the cable to receive the connector abuts against the undepressed right hand nest guide 409 which is aligned precisely so that the connector will be applied to the right hand end of cable 602. The opposite procedure is carried for placing a connector on the left hand end of a ribbon cable.

Once the ribbon cable 602 is in the position as shown in FIG. 20C the operator activates the machine to apply the connector to the right hand side of the cable. After the connector has been applied, the operator merely removes the cable 602 from left hand platen 640 allowing left hand platen 640 to assume its horizontal position as shown in FIG. 20A before starting the next operation.

Any suitable control system can be used to maintain absolute control over the various functions carried out by the machine. A suitable control system is exhibited in FIG. 21 which shows a schematic wiring diagram for one embodiment of such control. This wiring diagram has a normal production "run" as well as a testing loop entitled "test".

Figure 21:
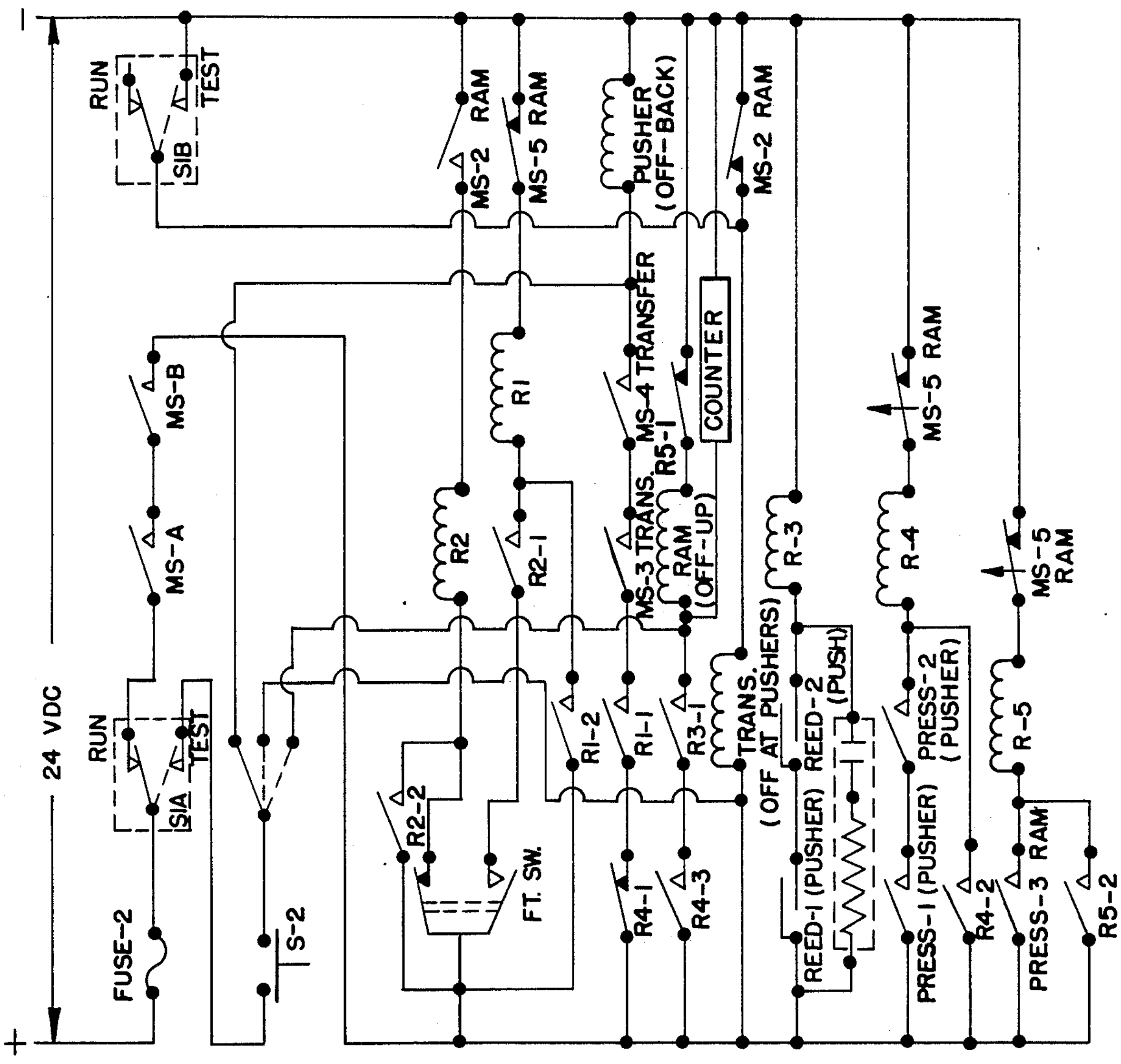
FIG. 21 is a circuit diagram which illustrates an electrical control scheme for the system.

With switch S1A (switch 506) in the down position as shown in FIG. 21, the test system may be tried. With three way switch 508 in the up position, the closing of switch S-2 (switch 504) will send current through the coil of the Pusher (off-back) solenoid air valve to verify the operability of the pusher drive mechanism. Then with the three way switch 508 in the middle position, the depression of switch S-2 will send current through the coil of the Transfer (off at pushers) solenoid air valve MS-2 Ram being normally closed, to verify the operability of the transfer drive mechanism. Lastly, with the three way switch 508 in the down position, the depression of switch S-2 will send power to the coil of the Ram (off-up) solenoid air valve switch MS-7 being normally closed, to verify the operability of the ram drive mechanism.

The description that follows relates to the normal production "run" loop to describe the various functions of an operation of the subsystem.

In regards to FIG. 21, the locations of various switches are found throughout the drawings schematically. For instance, MS-2, MS-5 and PRESS-3 are located in FIG. 14, MS-3, 4 are located in FIG. 10, MS-2 is also located in FIG. 15, MS-A, MS-B and MS-3 are located in FIG. 4 and REED-3, 4 and PRESS-1, 2 are located in FIG. 5. Also in regard to FIG. 21 the relay switches R1-1, R2-1, etc. are shown in their "normal" condition with no power to the coil. With regard to the ram, transfer member and pusher solenoid air valve coils, these coils are only energized, and these members activated, when all switches in series with them are closed. In addition, all solenoid air valves are spring returned. In other words, power is given to the valve during the forward stroke while the spring returns the mechanism to its original position when electrical power is removed.

As can be seen in FIG. 1, a foot switch, Ft. Sw., can activate the mechanism at the demand of an operator. Also control panel 502, FIG. 5, allows a serviceman or set-up man to run the machine in "run" or "test" position by selection of the position of toggle switch 506 or S1A and B. When in the test position, various moving subsystems can be tested individually as selected by the serviceman from the three position switch 508 or S2. Any testing has to be activated by the serviceman actuating push button switch 504 (S-3). When the serviceman has completed the testing, he returns switch S2 to the RUN position and replaces the machine cover. Regarding the air cylinders, ram air cylinder 438 is shown in FIG. 15, pusher air cylinders 554, 566 are shown in FIG. 4 and body portion transfer air cylinder 348 is shown in FIG. 10, it being understood that a like cylinder will be used for the cover portion transfer air cylinder which is not shown in this Figure.

A description of how the machine operates will now be given. As mentioned earlier, the semi-automatic harness maker is adapted to accommodate all sizes of connectors within a given type of connectors with minimum set-up or changeover.

The first thing that has to be done by the operator is to adjust the magazines for the connector to be applied by selecting and using the proper magazine gages. For intance, a particular size of gage can be picked for the FRS socket type of connector which has approximately 10 sizes therein. Within each type of connector, the only dimension that changes on the connector body and cover is the length thereof; that is, the distance measured parallel to the direction in which the pusher means operates. To change over from size to size within one type of connector, this is the only adjustment that must be changed in the system.

For each size connector within a given type of connector, there are two gages used to set the magazines. The first is a thin gage used to set the cover magazine generally on the right side of the machine as the operator faces the machine such as looking at the machine as in FIG. 1. The second gage is, a thicker gage for the body magazine on the left side of the machine. Looking at the portion of the magazine shown in FIG. 9A which equates to the cover portion of the connector, the operator loosens the two wing nuts 216 on the adjustable magazine loosening them only enough that the magazine can readily slide along the frame support 219. The operator then slides the adjustable magazine in or out as required so that the gage movably fits within the magazine guides. The gage should freely slide up and down within the magazine, but side to side looseness should be kept at a minimum. The operator then holds the adjustable magazine in this position and tightens the two wing knots securely. He then slides the gage up and out of the magazine and repeats the process for the magazine on the other side of the machine for the body portions.

In a hypothetical example given above, the connector body portions are loaded into the magazine on the left with the use of connector packages shown in FIGS. 1 and 8. With the connector body portions on the left side of the machine, the connector packages are to be placed on top of the magazine so that the IDC wire forks on the body portion of the connector face outward and the number one contact is toward the front of the machine. After the body container is arranged in this position, the operator should then up-end it so the bottom end is upward. The operator must then remove the plastic end stop from the upper end which holds the connector portions therein in the container and then place his finger over that end. The operator then reverses the container so that the open end is on the bottom with his finger holding the body portion of the connectors from falling out of the container. The operator then slides the body container down into the caps on the top of the magazine until the container bottoms on the top of the magazines. Now the operator slowly lowers the connectors held by his finger down into the magazine so that the lowermost connector portion rests on the transfer member at the bottom of the magazine or the uppermost connector body portion remaining from a prior run.

The same procedure is used for loading the connector cover packages into their magazine subassembly. In regard to the cover portions, they are generally loaded into their magazines with the locking latches pointed inward. When the strain relief recess on the cover is facing donward, it is in proper position for cable foldback on the left end of the harness. When the recess faces upward, it is in position for foldback on the right end of the harness.

The operator can now make a harness from the connector parts which have been loaded into the magazines. The ribbon cable should be precut to the proper length and the operator should make certain that the ends are square and cleanly cut. If mid-span connectors are to be installed, the centerline locations should be marked on the ribbon cable. The operator should turn the machine on and power up the system.

As described in conjunction with FIGS. 20 and 20A–C, the operator should then position the ribbon cable on the platen with the number one conductor to the front, closest to the operator, and against the ridge or guide on the platen. The operator will use the left or right table according to which way the connector covers have been loaded into the magazine. If the cover are positioned for left end installation then lay the cable on the right hand table. If the covers are positioned for right hand installation then lay the cable on the left hand table. The operator then holds the ribbon cable snuggly against the guide ridge at the front of the platen.

Once the cable is so positioned, the operator should push down so as to depress the platen approximately ⅛ of an inch. The operator then slides the ribbon cable towards the opposite platen, the non-depressed platen, until the end of the cable abuts against the nest guide of the opposite platen. Then, while lightly holding the ribbon cable in position on the platen the operator allows the platen that has been depressed to spring up to its horizontal position. The operator then depresses the front switch. At this point in time, the semi-automatic harness maker will push a connector body portion and cover portion into the press and drive the ram down compressing the connector onto the cable. Also, during this time, the transfer members will pick up another body and cover from the magazines for the next installation to be made and the ram will return to its upper or home position.

For installing mid-span connectors the following steps are carried out. The term "mid-span" is defined as the entire length of ribbon cable extending between the end connectors. The pre-made mark or marks on the cable where the connector or connectors are to be installed mid-span is aligned with a white centering mark on lower plate. As before, the edge of the ribbon cable is held flush against the guide ridge on both platens, as described in conjunction with FIGS. 20A–C. If there are previously installed connectors resting on the platen, they should be elevated and located so they rest upon the ridge to thereby permit the edges of the cable to be positioned snuggly against the ridge. During the mid-span connection process the operator does not push down on the cable platens but rather simply holds the cable in place and pushers the foot switch. By this procedure, as many connectors as desired can be installed along the mid-span of the cable.

Figure 2C:
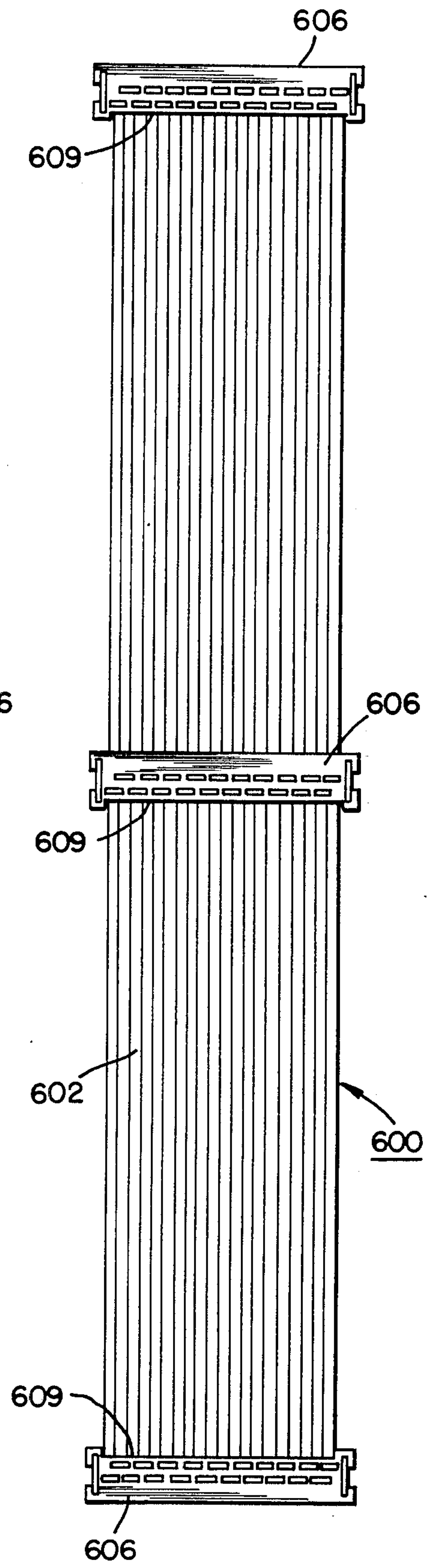

For installing the connector at the other end of the ribbon cable, the procedure given for the first end connector is followed except the cable is positioned on the opposite cable platen to that first used. It should be appreciated that this description is only one way in which the machine can be used to apply connectors to the ribbon cable. For instance, if desired, one can apply the connector so that its cover recess orientation is opposite to that as shown in FIG. 2C simply by reversing the orientation of the connector cover portions 606 in their magazines, as previously described, or as often as desired, any connector can be installed in the upside down position to that shown in FIG. 2B simply by flipping the ribbon cable over, keeping the first conductor 610 to the front. Thus an assembly can readily be made, different from that shown in FIGS. 2A–C, wherein one or move connectors have their cover and body portions on opposite sides of the ribbon cable as compared to the other connectors of the assembly.

A description is now given of what happens within the system when a connector is applied to the ribbon cable. Assuming that the operator has correctly placed the ribbon cable relative to the ram and anvil and activates the foot switch to begin the system cycle. At this time, the various subsystems are in the following conditions. The press assembly has its ram in its upper or home position, as shown in FIGS. 4, 14, and 15. The pushers 320 and 322 are located in their home positions, that is, retracted all the way back to the rear of the machine and out of engagement or obstruction to the transfer members, such as shown in solid lines in FIG. 3. Assuming at this time the operator is into a production run where a previous connection has been made with the same cover and body portions, the transfer members 310 and 312 are in the position shown in FIG. 11C. Since the transfer members have previously cycled to pick up a cover and a body portion, those portions are already located in retention cavities 606 and 608 for this installation and the transfer members are in their respective unloading positions.

Figure 13D:
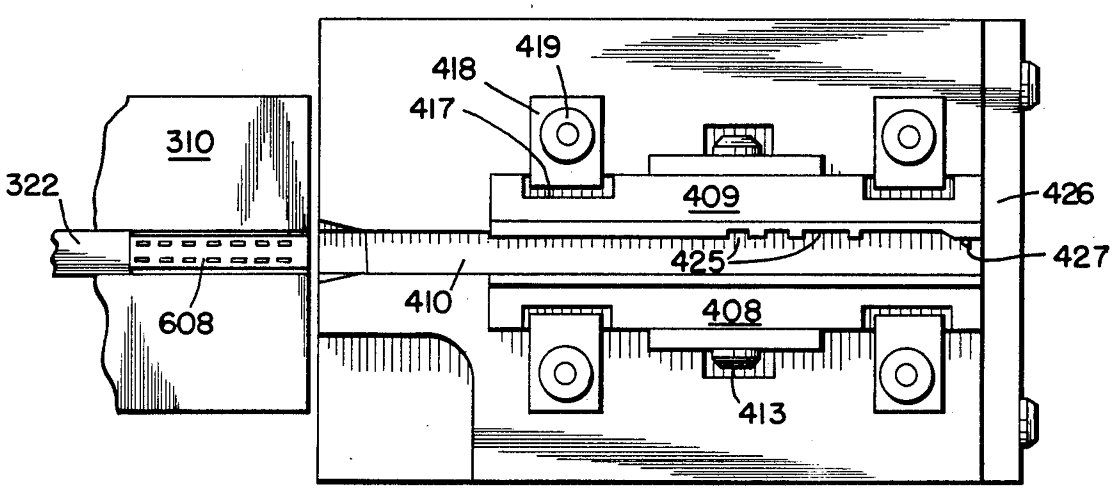
FIG. 13D is a top diagrammatic view of the nest assembly.
Figure 13C:
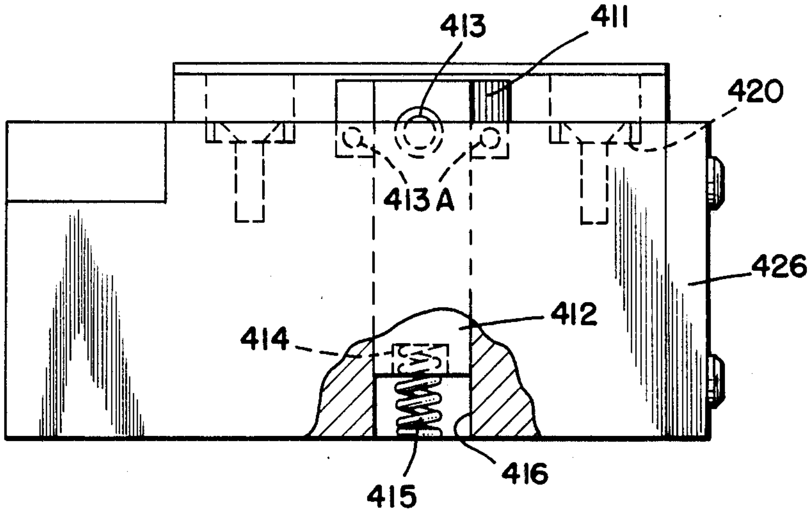
FIG. 13C is a fragmented diagrammatic sideview of the nest assembly of FIG. 13B taken from the left side of FIG. 13 showing the position of the end plate.

The foot switch is activated by the operator and this in turn, activates pusher air cylinders 554, 556 which, as seen in FIG. 3 in dotted lines, cause pushers 320 and 322 to leave their home positions shown in solid lines of FIG. 3 and move towards and through the transfer members 310 and 312 into the termination station 400. As the pushers 320 and 322 pass adjacent the transfer members, the cover and body portions are also positioned in the paths of the pushers by the transfer members. Thus, the pushers contact the rear facing edges of the cover and body portions and push them out of the transfer members and into the termination station. Cover portion 606 slides as it is pushed into ram shoe retention cavity 472 as shown in FIG. 17 while body portion 608 slides as it is pushed into nest 412 as shown in FIG. 13C. Pusher 320 pushes against cover 606 until it abuts the inside surface of ram shoe stop 468, and stops (note FIG. 19). Pusher 322 pushes against body 608 until it abuts the inside surface of the nest stop plate 426 and stops (note FIG. 14). Both the cover and body portions are now in proper alignment for their coupling to the ribbon cable.

This stopping of the cover portion and its pusher means, and the body portion and its pusher means, in turn stops the movement of the pistons in pusher air cylinders 554 and 556. This stoppage causes the pressure to commence building up in these cylinders. When the pressure reaches a pre-determined value it causes pressure sensing switches Press-1 and Press-2 to close their electrical contact to the ON condition. Press-1 senses the pressure in air cylinder 554 and Press-2 senses the pressure in air cylinder 556. Press-1 and Press-2 are adjustable type pressure sensors and are pre-set at the time of the machine assembly to the pre-determined pressure value, which is enough to assure that the cover and body connector portions are pushed fully to the stop positions, but not so much as to endanger damage to the cover and body portions due to too much force by the pusher means. Press-1 and Press-2 are located as to sense the pressure at the advance ports of their respective cylinders. Since the advance ports are exhausted at atmosphere on the return stroke of these pusher cylinders, the Press-1 and Press-2 electrical contacts are opened to the return stroke and thus are re-set and awaiting the next machine cycle.

Since the Press-1 and Press-2 electrical contacts are connected in series as shown in FIG. 21, it does not matter if they close at the same instant or at different instants, both must be closed to achieve an "on" circuit. If one closes first it holds and waits for the closure of the other.

The closing of Press-1 and Press-2 electrical contacts triggers an electrical circuit action which causes pusher air cylinder to retract this being fully explained later. The retraction of pusher air cylinders in turn retracts the pusher means 320 and 322 back to their home positions.

When the pusher means reach their home positions another electrical circuit action is triggered, to be fully explained later, which causes ram air cylinder 438 to be sent on its advance or down stroke. This in turn sends ram 432, and all associated parts fastened thereto, on the down stroke, driven by the force of cylinder 438.

The ram at this time has its ram shoe assembly holding the connector cover portion in the correct position for assembly to the ribbon cable and connector body portion located in the lower part of the press. The stroke of the ram and the force of the ram, imparted by ram cylinder 438, are sufficient to fully compress the connector cover and connector body together about the ribbon cable into the final assembled condition. The ram is allowed to advance downwardly a small distance further than required to fully compress the connector cover and body together about the ribbon cable. This small over-advance of the ram may compensate for manufacturing tolerances which occur in the connector cover and body portions and in the ribbon cable. Thus, a fully completed connection is assured within the tolerance variations of the parts. This small over-advance or over-compression does not harm the connector parts or the ribbon cable since there is enough resiliency in their combined masses to absorb this small additional compression.

When the ram has reached this final downward advance position it is stopped by the solid abutting of ram shoe stop 468 upon nest stop plate 420 at the front of shoe and the solid butting of rear ram block 466 upon the right and left nest blocks 405 and 406 at the rear of the ram shoe. This front and rear abutting, together with the pivoting action of the ram shoe as explained previously, assures that the connector cover and body portions are uniformly compresses together over their entire length regardless of the length or size of the connector portions.

The stoppage of the ram advance and, in turn, the stoppage of ram air cylinder 438 piston, causes air pressure to build up in the advance side of the air cylinder. A pressure sensor Press-3, connected to the advance port of the ram air cylinder has been pre-set at machine assembly so that its electrical contacts are closed at the pressure required to achieve the full butting position of the ram show as poreviously described. The closing to the ON position of the Press-3 electrical contacts triggers an electrical circuit which causes the ram air cylinder to retract to its up position, as will be explained later. The exhausting of the pressure in the advance or downward pressure side of the ram air cylinder causes Press-3 contacts to open.

As the ram moves up on its retract stroke, electrical circuits are triggered which cause the transfer members to rotate back to their positions ready for the pusher means, with a fresh body and cover portion in place. Also, during the ram retract stroke the remaining circuit components are reset to their start of cycle condition so that the machine is ready for the next cycle.

Air flow control devices are used in the air lines supplying air to the air cylinders. These are of the adjustable type and are set the time of machine assembly to give the right velocity of movement of the air cylinder piston and rod, making for a smooth operation of the machine. Flow control devices are also used in the air lines going to pressure sensing switches, Press-1, 2, and 3. By setting the flow control at the rate desired, the action of the pressure sensing switches can be delayed for an interval of time and thus provide a dwell of the component at its actuated position. This means is used to provide a short interval or dwell, approximately 0.5 seconds, of the ram at its full butted position and the pusher means at their extended positions where the body and cover portions are pushed into position.

The overall complete cycle time of the machine is 3.5 seconds. Thus the machine is capable of 1028 cycles per hour. Of course time is needed by the operator to position the ribbon cable and actuate the Foot Switch, Ft. Sw. Operators with very little experience have attained 500 or more installed connectors per hour.

The design of the machine control circuit is such as to assure that each step of the cycle occurs in the proper sequence and for the proper duration. It also assures that if a jaw or malfunction occurs, the controls will not initiate the next step. Therefore, damage to machine parts will be abated. Furthermore, the present design conserves time and speeds up production by making more than one operational event occur at a single time during the cycle, thus shortening the overall cycle time.

Power is applied in the normal operation or run cycle with switches S1A and S1B in the UP or RUN orientation as shown in FIG. 21 to bring power across the safety fuse device, FUSE-2, and across switches MS-A and MS-B which are closed only when the safety cover is properly in place. This is to increase operator safety. Two suitable switches, located a sufficient distance apart, are used as the safety feature to make it very difficult for the operator to hold them both closed and operate the machine without the safety cover closed.

To begin the installation cycle, the Foot Switch, Ft. Sw., is actuated by the operator to energize the coil of relay R-1. Connected in parallel with the Reed Switches, a resistor and capacitor of proper values, connected in series, protect the Reed Switch contacts against damage from inductive spikes. The Reed Switches are mounted directly on the pusher cylinders and are actuated by a magnet built into the pistons of the cylinders. When the pistons are in their rearward positions, pushers at home position, the Reed Switches are held closed by the magnet force.

A complete explanation of the functioning of the electrical control circuit of the machine will now be given with particular reference to FIG. 21 as well as to FIGS. 21A and 21B which when taken together, illustrate the circuitry and its other operational components.

The electrical control sequence may be initiated by an operator only after the machine is plugged in to a power source of 115 volts alternating current and appropriately coupled to a pressure source of air at 90 pounds per square inch. Switch S1A and S1B are initially set at RUN. The safety cover must be in place which closes MS-A and MS-B. With the ram at its top or home position, MS-2 N.O. (normally open) is closed and MS-2 N.C. (normally closed) is open. MS-3 and MS-4 are closed when the transfer means are at the pusher means home or retracted positions, which they are prior to the intiation of a cycle of operation. The Power Switch is then pushed to ON, and the 24 volt, direct current circuit is powered. Relay-2, R2, is turned ON and its contacts R2-1 and R2-2 are closed. Reed-1 and Reed-2 are closed because the pusher cylinders are in their retracted or rear positions and the magnets on their pistons are holding these magnetic reed switches closed. Hence R-3 is turned ON and its contact R3-1 is closed.

The operator next closes Foot Switch, Ft. Sw. The normally closed Foot Switch N.C. contacts thus go open and the normally open Foot Switch N.O. contacts thus go closed. Relay R1 is then turned on which closes its contacts R1-1 and R1-2. Relays R1 and R2 are now held ON by their own holding contacts R1-2 and R2-2, respectively, so that the operator's Foot Switch no longer controls the circuit whether it is held down or released. The closing of R1-1 energizes the pusher solenoid air value causing it to shuttle to the forward position and start the pusher air cylinders coming forward.

As the pusher means move forward and leave their retracted or home positions, the Reed-1 and Reed-2 contacts open. R-3 goes OFF and its R3-1 contacts open. When the pusher means reach their full forward position, the Press-1 and Press-2 contacts close and Relay R-4 is turned ON, which in turn opens its contact R4-1 and closes its contacts R4-2 and R4-3.

With the control circuitry in this orientation, the pusher means now return to their retracted or home positions. Press 1 and Press 2 open. Reed-1 and Reed-2 close. Relay R-3 is turned ON and its R3-1 contact closes and the ram solenoid air valve is energized. Also, a counter counts one count.

The ram now starts down causing normally open MS-2 N.O. to open and normally closed MS-2 N.C. to close. The transfer solenoid valve is also energized and the transfer air cylinders stroke back and the transfer members rotate back to receive connector portions from the magazines. Transfer Switches MS-3 and MS-4 also go open. Relay R2 is turned OFF and its contacts R2-1 and R2-2 open.

At this time, the ram reaches the bottom of its stroke and abuts the ram shoe on the nest assembly to force the stopping of the ram. Due to the pressure build up, Press-3 closes. Relay R-5 is thus energized and its contacts R5-1 opens and its contact R5-2 closes. The connector has been installed onto a cable.

The ram now starts its return back to its retracted or home position. Press-3 now opens. About two-thirds of the way along the up stroke of the ram, MS-5 is opened. Relay R1 is turned OFF which opens contacts R1-1 and R2-2. Relay R-4 is turned OFF which closes its contact R4-1 and opens its contacts R4-2 and R4-3. Relay R-5 is also turned OFF which closes its R5-1 contact and opens its R5-2 contact.

The ram continues its upward movement and when it is about seven eighths of the way up, MS-5 comes off its actuator and closes. Approximately 0.030 inches before the ram reaches its top or home position, normally open MS-2 N.O. is closed and normally closed MS-2 N.C. is opened. Relay R2 is thus turned ON and its contact R2-1 and R2-2 are closed. If the operator is still holding the Foot Switch, Ft. Sw., depressed, Relay R2 is not turned ON until the Foot Switch is released. The opening of normally closed MS-2 N.C. cuts the current to the transfer solenoid air valves, and the transfer members are then rotated back to their home positions adjacent the pusher means with a fresh body and cover in place. MS-3 and MS-4 are closed.

All circuits and control components are now in the same state and before the initiation of the first cycle which is the same state as before the immediately preceeding cycle. The machine is now ready for the initiation of the next cycle.

It should be appreciated that motors can be used with direct electrical or electronic control rather than the air cylinders and circuitry described above. It should be appreciated that any type of suitable magazines can be used for the connectors. In the case of the machine described above, up to 50 connectors can be located in each of the containers placed on the magazines. It can also be appreciated that when the connectors are depleted in the connector part packages, the operator need not stop the production cycle in order to replenish the connector parts. All that needs to be done is the empty container removed from the magazine, as by attendant, and then a fresh full container replaced while production continues on.

As mentioned above, the body portions generally go into the left magazine and the cover portions in the right magazine, as viewed from the front of the machine. If reversal is desired, the cable can be flipped 180 degrees and for end. Thus, the connector may be oriented either facing up or down as desired. Because of this possibility the container should be reversable in the magazine to make it completely universal in operation. In addition, the cross section of the containers must have a centerline of symmetry thus allowing an operator to flip them 180 degrees when going from end to end. The container, it shall be appreciated, slides only partially toward the bottom of the magazine, it actually bottoms out on the top of the magazine base. The cap portion of the magazine has room for about 10 to 12 connector portions thus when less than that many exist in the magazine, the container is empty and can be changed to keep production proceeding on a continuous basis.

When the operator has finished a production run on the system and a new size of connector is desired to be used in a subsequent job, the operator merely removes the previous part from the magazines except for that cover and body portion which are on the transfer members. The operator will then readjust the magazines with the proper gage associated with the new size connector, put new containers bearing the covers and bodies desired in the next job and perform one cycle T on a scrap piece of cable before starting the next job so as to remove the last cover and body portions of the previous job from the system.

The design of the machine is such that many of the machine parts are common among a family of machines to install several different types or styles of connectors. Thus machines employing the design and functions of this machine can be used for installing many different types and styles of connectors. As stated above, when changing from one size to another within a given type of connector, one only has to use the cover and body gages to set the magazines to the proper distance.

It is also conceivable and within the purview of the present invention to change to a different type of connector totally. In order to do this, one should change the magazine width as described in the above example. One should also change the transfer member slot width, the shoe slot width, the nest slot width and depth and the ends of the pusher so that the size is appropriate to the type of connectors being used in the next production run. In the case of the FRE edgecard connector type, one should also reverse the top and bottom of the connector so that the body is in the ram and held by the shoe since the top is too small to be held by the ram it must be placed in the nest. Thus, what is described is an interchangeable part system to cover a great many sizes and classes of ribbon cable connectors with IDC connections.

It should be understood that the foregoing is only illustrative of the invention. Various alternatives and modifications in the structural and functional features of the connector device can be devised by those skilled in the art without departing from the invention. Accordingly, the present invention is intended to embrace all such alternatives, modifications and variations which fall within the spirit and scope of the appended claims.

What is claimed is:

1. Apparatus for installing connectors, each having a body portion and a cover portion, onto flat cables having multiple electrical conductors separated by, and encased in, electrically insulating material, said apparatus comprising:

(a) a frame;

(b) an installation station coupled to said frame for supporting cables in a generally horizontal plane, said installation station also including press means coupled to said frame for coupling connectors to cables supported at said installation station;

(c) magazines on said frame adapted to support a plurality of body portions and cover portions respectively in a generally vertical orientation above, and laterally offset from, said installation station; and (d) a transport station coupled to said frame and operatively positioned with respect to said magazines and said installation station to sequentially move connector portions from said magazines to said installation station while reorienting them from a vertical orientation to a horizontal orientation.

2. The apparatus as set forth in claim 1 wherein said magazines include a first magazine for supporting a stack of connector body portions and a second magazine for supporting a stack of connector cover portions, each of said magazines having an open upper end for the receipt of additional connector portions and an open lower end for the feeding of connector portions to said transport station.

3. The apparatus as set forth in claim 2 wherein the body portions and the cover portions are fed from the upper ends to the lower ends of the magazines and to said transport station by the force of gravity.

4. The apparatus as set forth in claim 3 wherein each magazine is of a cross sectional size and configuration to receive a connector portion.

5. The apparatus as set forth in claim 4 wherein an upper segment of each magazine is enlarged in cross section for the receipt of a package of connector portions.

6. The apparatus as set forth in claim 5 and further including spring biased surfaces in the upper segment of each magazine to receive and retain a container of connector portions.

7. The apparatus as set forth in claim 1 and further including means releasably fastened to said magazines to adjust each said magazine for the accommodation of connector portions of varying sizes.

8. Apparatus for installing connectors, each having a body portion and a cover portion, onto flat cables having multiple electrical conductors separated by, and encased in, electrically insulating material, said apparatus comprising:

(a) a frame;

(b) an installation station on said frame including a platen operatively positioned with respect to said frame and having separate parts with cable supporting surfaces laterally offset from each other with a space therebetween, said installation station also including press means coupled to said frame for coupling connectors to cables supported at said installation station at the aforementioned space;

(c) magazines on said frame adapted to support a plurality of body portions and cover portions respectively in a generally vertical orientation above, and laterally offset from, said installation station with the cable-facing sides, the sides adapted to contact the faces of the cable, being disposed in generally vertical planes; and (d) a transport station coupled to said frame and operatively positioned with respect to said magazines and said installation station v to sequentially move portions of connectors from said magazines to said installation station while reorienting them from a vertical orientation to a horizontal orientation.

9. The apparatus as set forth in claim 8 wherein said separate parts are located on opposite sides of said press means and extend in a first, generally horizontal plane.

10. The apparatus as set forth in claim 9 wherein said press means includes an anvil and a ram assembly movable with respect said anvil.

11. The apparatus as set forth in claim 10 and further including first drive means coupled to said ram assembly to reciprocate said ram assembly in a generally vertical second plane which passes between the parts of said platen and generally perpendicular to said first plane.

12. The apparatus as set forth in claim 11 wherein said transport means includes, for each magazine, a reorientation means and a pusher means, both said last mentioned means being movably secured with respect to said frame.

13. The apparatus as set forth in claim 12 wherein each said reorientation means is located beneath a magazine and is adapted to receive connector portions at a loading station in a first orientation and to reorient such connector portions during transportation to an unloading station in a second orientation.

14. The apparatus as set forth in claim 13 wherein each said reorientation means is rotatable about an axis, with each said axis parallel to each other but with one axis above and one axis below said first mentioned horizontal plane.

15. The apparatus as set forth in claim 13 wherein each said pusher means is located with its axis in a generally vertical plane, coextensive with said second plane.

16. The apparatus as set forth in claim 15 and further including additional drive means operatively coupled with resepct to said pusher means to reciprocate said pusher means within said second plane from a home position adjacent the unloading station to an extended position adjacent said press means.

17. The apparatus as set forth in claim 16 and further including control means operatively coupled with respect to said pusher means and said reorientation means to retain said pusher means in their home positions while said reorientating means are transporting connector portions from said loading stations to said unloading stations.

18. The apparatus as set forth in claim 17 wherein said control means is adapted to inactivate said reorienting means while said pusher means move to transport connector portions from said reorientation means to said installation station and then return to their home positions.

19. The apparatus as set forth in claim 18 wherein said control means is adapted to return said reorienting means for the receipt of additional connector portions from said magazines while said pusher means are at their home positions.

20. Apparatus for installing connectors, each having a body portion and a cover portion, onto flat cables having multiple electrical conductors separated by, and encased in, electrically insulating material, said apparatus comprising:

(a) a frame;

(b) an installation station coupled to said frame for supporting cables in a generally horizontal plane, said installation station also including reciprocal press means coupled to said frame for coupling connectors to cables supported at said installation station;

(c) magazines on said frame adapted to support a plurality of body portions and cover portions repsectively in a generally vertical orientation above, and laterally offset from, said installation station; and (d) a transport station coupled to said frame and operatively positioned with respect to said magazines and said installation station to sequentially move portions of connectors from said magazines to said installation station, said transport station including a reorienting means coupled with respect to said frame to move connector portions from a loading position at said magazines to an unloading position at a remote location while reorienting them from a vertical orientation to a horizontal orientation, said transport station also including pusher means movably secured with respect to said frame for each reorienting means and reciprocal in a path of movement to transport connector portions from said remote location to said installation station.

21. The apparatus as set forth in claim 20 and further including control means operatively coupled with respect to said reorienting means, pusher means and press means to effect the predetermined sequential movement of said reorienting means, said pusher means and said press means.

22. The apparatus as set forth in claim 21 wherein said control means may be initiated at the discretion of an operator.

23. The apparatus as set forth in claim 22 wherein the initiation of said control means will first activate said reorienting means to transport connector portions from said magazines to a location adjacent said pusher means, then to reciprocate said pusher means from their home positions to adjacent said installation station and the back to their home positions to thereby transport connector portions to said installation station, and then to activate said press means to couple a connector means to a cable, and then to return said reorienting means back for the receipt of additional connector portions from said magazines.

24. Apparatus for installing connectors, each having a body portion and a cover portion, onto flat cables having multiple electrical conductors separated by, and encased in, electrically insulating material, said apparatus comprising:

(a) a frame;

(b) an installation station on said frame including a platen operatively positioned with respect to said frame and having separate parts with horizontal cable supporting surfaces laterally offset from each other with a space therebetween, said surfaces each being supported by spring means coupled to said parts to urge said parts upwardly into a common horizontal plane, said installation station also including press means coupled to said frame for coupling connectors to cables supported at said installation station at the aforementioned space;

(c) magaziries on said frame adapted to support a plurality of body portions and cover portions respectively in a generally vertical orientation above, and laterally offset from, said installation station with the cable-facing sides, the sides adapted to contact the faces of the cable, being disposed in generally vertical planes; and (d) a transport station coupled to said frame and operatively positioned with respect to said magazines and said installation station to sequentially move portions of connectors from said magazines to said installation station while reorienting from a vertical orientation to a horizontal orientation.

25. The apparatus as set forth in claim 24 and further including abutment surfaces formed on and vertically upstanding from, said cable supporting surfaces to assist an operator in properly locating a cable at said installation station.

26. The apparatus as set forth in claim 24 and further including additional abutment surfaces formed on the adjacent vertical edges of said cable supporting surfaces to assist an operator in properly locating a cable at said installation station when a connector portion is to be coupled to an end of a cable.

27. A method of installing electrical connectors, each having a body portion and a cover portion, to flat cables having multiple electrical conductors separated by, and encased in, electrically insulating material, including steps of:

(a) loading a quantity of stacked connector body and cover portions into magazines extending on a generally vertical orientation;

(b) rotating reorienting means to transport a body portion and a cover portion gravity fed from the bottoms of said magazines to intermediate locations;

(c) pushing the body portion and the cover portion from the intermediate locations to an installation station;

(d) coupling the body portion and the cover portion to a cable located in a horizontal plane at the installation station and to each other; and (e) repeating the rotating, pushing and coupling steps in a continuous cycle of operation.

28. The method as set forth in claim 27 wherein each cycle of operation is initiated at the discretion of an operator.

29. The method as set forth in claim 27 and further including the step of adding additional body portions and cover portions to the magazines through openings at the top of the magazines.

30. The method as set forth in claim 27 and further including the step of inverting the cable before repeating the rotating, pushing and coupling steps to thereby couple connectors to the cable with body portions on opposite sides of the cable.

31. The method as set forth in claim 27 wherein the steps of rotating, pushing and coupling are all automatically controlled for proper sequence and duration.

32. The method as set forth in claim 31 and further including the interruption of the sequence of steps in the event of a malfunction as caused by a jam.

33. The method as set forth in claim 31 wherein at least one of the steps is automatically initiated before the completion of the previous step.

34. The method as set forth in claim 33 wherein the step of rotating the reorienting means is initiated during the coupling step.

35. The method as set forth in claim 31 and further including flow controls to retard the flow of fluids to the pressure sensors so as to achieve a time delay or dwell feature.

36. The method as set forth in claim 27 and further including the step of properly locating a cable at the installation by resting the cable on a platen disposed in a horizontal plane and then abuting a longitudinal edge of the cable against an abutment surface vertically upstanding from the platen.

37. The method as set forth in claim 36 wherein the platen is formed of two spaced parts which are independently spring biased upwardly to the aforementioned horizontal plane and further including the step of depressing one part of the platen with a cable against the resistance of the spring bias and then abuting a transverse edge of the cable against the undepressed platen and then allowing the depressed platen and cable to rise to the aforementioned horizontal plane.

* * * * *